(12) United States Patent
Fukui et al.

(10) Patent No.: US 10,800,008 B2
(45) Date of Patent: Oct. 13, 2020

(54) CLAMP DEVICE

(71) Applicant: SMC CORPORATION, Chiyoda-ku (JP)

(72) Inventors: Chiaki Fukui, Abiko (JP); Kazuyoshi Takahashi, Koto-ku (JP); Hideki Sasaki, Toride (JP); Takeshi Seo, Nagareyama (JP); Jiro Mandokoro, Moriya (JP); Koichi Katsumata, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 266 days.

(21) Appl. No.: 15/551,360

(22) PCT Filed: Nov. 18, 2015

(86) PCT No.: PCT/JP2015/082342
§ 371 (c)(1),
(2) Date: Aug. 16, 2017

(87) PCT Pub. No.: WO2016/132614
PCT Pub. Date: Aug. 25, 2016

(65) Prior Publication Data
US 2018/0029196 A1    Feb. 1, 2018

(30) Foreign Application Priority Data

Feb. 16, 2015 (JP) .................... 2015-027427

(51) Int. Cl.
*B25B 5/08* (2006.01)
*B25B 5/12* (2006.01)
(Continued)

(52) U.S. Cl.
CPC .............. *B25B 5/087* (2013.01); *B23K 31/02* (2013.01); *B23K 37/0435* (2013.01); *B25B 5/02* (2013.01);
(Continued)

(58) Field of Classification Search
CPC .. B25B 5/02; B25B 5/04; B25B 5/087; B25B 5/122; B25B 5/16; B23Q 17/003
(Continued)

(56) References Cited

U.S. PATENT DOCUMENTS 5,174,489 A * 12/1992 Mason ................. B23K 11/312
219/86.25
5,330,168 A * 7/1994 Enomoto ............... B23Q 3/069
269/329
(Continued)

FOREIGN PATENT DOCUMENTS

EP    0636449 A1    2/1995
JP    2001-113468 A    4/2001

OTHER PUBLICATIONS

International Search Report dated Dec. 15, 2015 in PCT/JP2015/082342, filed Nov. 18, 2015.
(Continued)

*Primary Examiner* — Orlando E Aviles
*Assistant Examiner* — Seahee Hong
(74) *Attorney, Agent, or Firm* — Oblon, McClelland, Maier & Neustadt, L.L.P.

(57) ABSTRACT

A clamp device is provided with a detection section which detects the pivotal position of a clamp arm. The detection section has: a cam section which is provided on a pivot shaft, includes a predetermined cam surface, and is formed so that the radial distance from the center of the pivot shaft to the
(Continued)

cam surface varies circumferentially; and a proximity sensor which detects the position of the cam surface which varies as the pivot shaft pivots.

20 Claims, 17 Drawing Sheets

(51) Int. Cl.
    *B25B 5/02*           (2006.01)
    *B25B 5/16*           (2006.01)
    *B23K 31/02*          (2006.01)
    *B23K 37/04*          (2006.01)
    *B23K 101/00*        (2006.01)

(52) U.S. Cl.
    CPC ............... *B25B 5/122* (2013.01); *B25B 5/16* (2013.01); *B23K 2101/006* (2018.08)

(58) Field of Classification Search
    USPC .................................. 269/20, 24, 27, 32, 228
    See application file for complete search history.

(56) References Cited

U.S. PATENT DOCUMENTS

| | | | | |
|---|---|---|---|---|
| 5,829,112 A * | 11/1998 | Blatt | ..................... | B25B 1/2484 29/416 |
| 5,996,984 A * | 12/1999 | Takahashi | ................. | B25B 5/16 269/228 |
| 6,192,284 B1 * | 2/2001 | Golden | ............... | B23Q 17/003 700/150 |
| 6,354,580 B1 * | 3/2002 | Nagai | ..................... | B25B 5/12 269/225 |
| 6,364,301 B1 * | 4/2002 | Takahashi | ............... | B25B 5/122 269/228 |
| 6,908,077 B2 * | 6/2005 | Sawdon | .................. | B25B 5/064 269/32 |
| 2003/0080283 A1 * | 5/2003 | Migliori | ..................... | B25B 5/16 250/221 |
| 2004/0041324 A1 * | 3/2004 | Fukui | ..................... | B25B 5/16 269/32 |
| 2004/0061268 A1 * | 4/2004 | Sawdon | .................. | B25B 5/087 269/32 |
| 2004/0061270 A1 * | 4/2004 | McCormick | ............. | B25B 5/12 269/240 |
| 2004/0150149 A1 * | 8/2004 | Zhao | ....................... | B25B 5/06 269/32 |
| 2004/0195750 A1 * | 10/2004 | Migliori | .................... | B25B 5/16 269/216 |
| 2005/0126865 A1 * | 6/2005 | Sato | ........................ | B25B 5/12 188/156 |
| 2008/0197553 A1 | 8/2008 | Rudaitis et al. | | |
| 2011/0162522 A1 * | 7/2011 | Tunkers | ............... | F15B 11/0325 95/5 R |
| 2014/0035212 A1 * | 2/2014 | Dellach | .................. | B25B 5/122 269/32 |
| 2014/0232051 A1 * | 8/2014 | Higurashi | ............... | B25B 5/122 269/20 |

OTHER PUBLICATIONS

Office Action dated Jan. 9, 2020 issued in Indian Patent Application No. 201747032203 w/English translation. 6 pages.

* cited by examiner

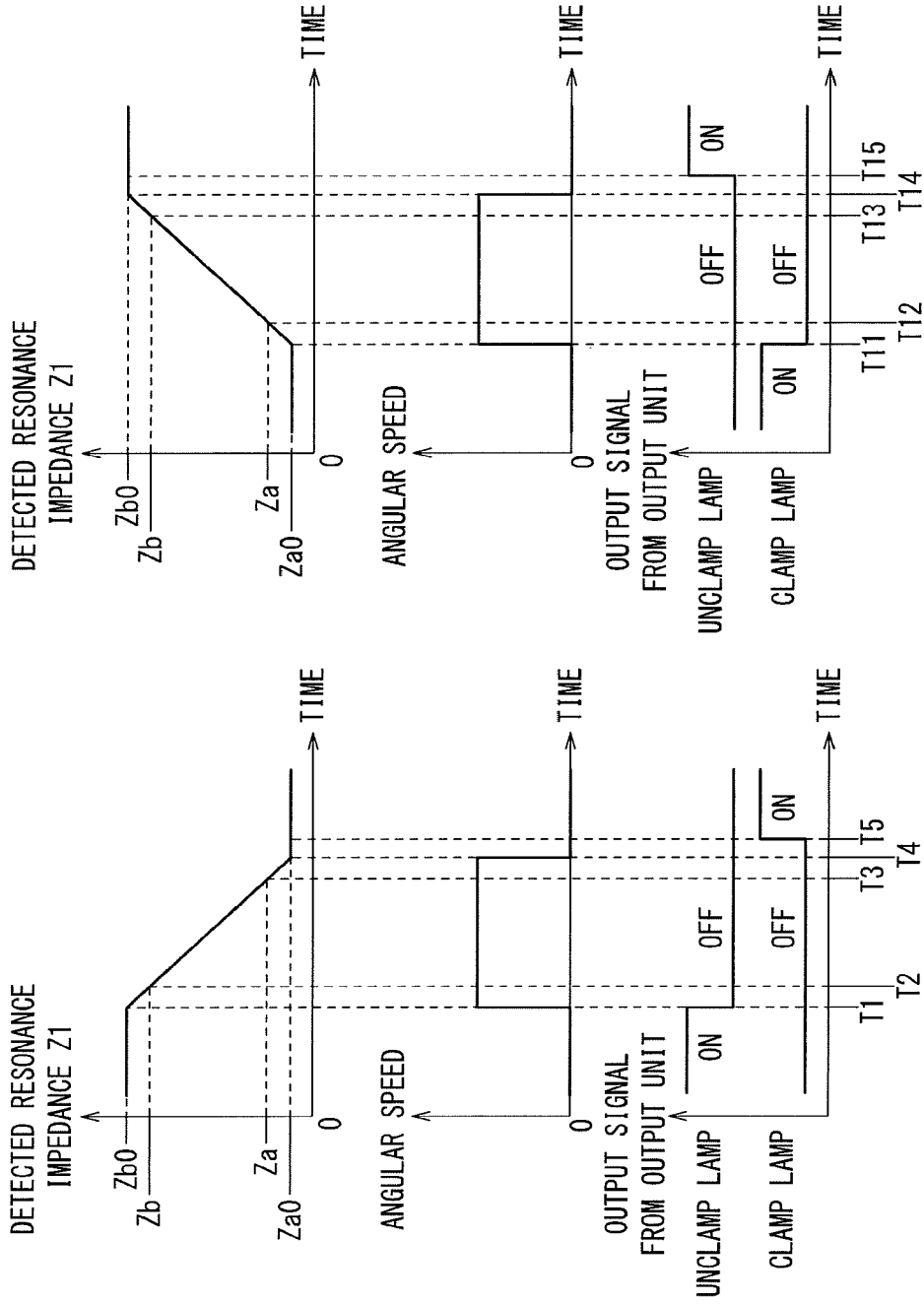

CLAMP DEVICE

TECHNICAL FIELD

The present invention relates to a clamp device for clamping a workpiece by a rotatable clamp arm.

BACKGROUND ART

Conventionally, for example, in welding components such as automobiles, a clamp device is used to clamp the components. In this type of clamp device, the piston of the cylinder portion is displaced in the axial direction under the action of the fluid pressure, so that the clamp arm is rotated through a predetermined angle by the toggle link mechanism connected to the piston rod based on a displacement amount of the piston, for switching between a clamping state in which the workpiece can be clamped and an unclamping state in which the clamping state is released (see, for example, Japanese Laid-Open Patent Publication No. 2001-113468 and European Patent Application Publication No. 0636449).

Further, in the clamp device disclosed in Japanese Laid-Open Patent Publication No. 2001-113468, the detection portion is connected to the knuckle block connected to the piston rod, and the detection portion is connected to the knuckle block by two proximity sensors provided on the side portion of the clamp body, whereby detecting the rotating state of the clamp arm.

SUMMARY OF INVENTION

In the above-described conventional technique, the rotating state of the clamp arm is indirectly detected by detecting the position of the detecting portion displaced in stroke together with the piston rod. In other words, it does not directly detect the rotating operation of the clamp arm. Therefore, the correspondence relationship between the position of the detection part and the position of the clamp arm (the detection accuracy of the rotating state of the clamp arm) affects the machining accuracy of the toggle link mechanism and the assembling accuracy. Therefore, with such an indirect detection method, it is not easy to improve the detection accuracy of the rotating state of the clamp arm.

An object of the present invention is to provide a clamp device capable of directly and highly accurately detecting the rotating state of a clamp arm with a simple configuration.

In order to achieve the above object, a clamp device according to the present invention is a clamp device for clamping a workpiece with a rotatable clamp arm, comprising: a clamp body; a driving unit provided on the clamp body; a rotatable shaft integrally rotating with the clamp arm under an action of the driving unit, and a detecting portion for detecting a rotational position of the clamp arm, wherein the detecting portion comprises a cam portion disposed on the rotatable shaft and including a predetermined cam surface, the cam portion being formed so that a distance in a radial direction from a center of the rotating shaft to the cam surface varies along a circumferential direction, and a cam surface proximity sensor for detecting the position of the cam surface which is displaced as the rotatable shaft rotates.

According to such a configuration, since the cam surface proximity sensor detects the position of the cam surface of the cam portion provided on the rotatable shaft integrally rotating with the clamp arm, the rotating state of the clamp arm can be detected directly and highly accurately with such a simple structure.

The clamp device described above may include a determination unit that determines whether the clamp device is in a clamp state based on a comparison between the output signal from the cam surface proximity sensor and a predetermined clamp threshold value or the claim device is in an unclamp state based on the output signal from the cam surface proximity sensor and a predetermined unclamp threshold value.

With such a configuration, it is possible to easily and reliably determine the clamp state and the unclamp state.

The clamp device may further comprise a rotation angle range adjustment mechanism for adjusting a rotation angle range of the clamp arm.

According to such a configuration, it is possible to clamp various workpieces having different shapes and sizes.

In the clamp device described above, the cam portion may be made of a metal material, and the cam surface proximity sensor may be an induction-type proximity sensor.

According to such a configuration, as compared with the case of using the magnetic detection sensor, the cam surface proximity sensor operates more stably when using the claim device under the welding environment, because of the lower vulnerability to the direct current generated in welding.

In the above clamp device, the cam surface proximity sensor may be disposed in the clamp body formed of a material including metal.

According to such a configuration, the clamp device can be downsized as compared with the case where the cam surface proximity sensor is disposed outside the clamp body. In addition, since the clamp body functions as a magnetic shield, it is less likely to be affected by the direct current magnetic field generated in welding.

The clamp device may further comprises a clamp lamp which is disposed so as to be visible from the outside in the above-described clamp device and turned on when the determination unit determines the clamp state, and an unclamp lamp which is disposed so as to be visible from the outside and turned on when the unclamp state is determined.

With such a configuration, the user can easily confirm the clamped state and the unclamp state of the workpiece by visually confirming the clamp lamp and the unclamp lamp.

The clamp device may further comprises a setting operation section which can be operated by the user, and a threshold value setting unit that sets the clamp threshold value based on an output signal of the cam surface proximity sensor when a first operation is made to the setting operation section, and sets the unclamp threshold value based on an output signal of the cam surface proximity sensor when the second operation is made to the setting operation section.

According to such a configuration, it is possible to easily set the clamp threshold value and the unclamp threshold value according to the shape and size of the workpiece to be clamped.

In the above-described clamp device, the driving unit has a cylinder tube, a piston reciprocating in the cylinder tube along the axial direction under the action of fluid pressure, and a piston rod connected to the piston, wherein the piston rod is provided with a link mechanism for converting the reciprocating motion of the piston into a rotating motion of the rotatable shaft, and the detecting portion includes a detecting body displaced in stroke together with the piston rod, and a detecting body proximity sensor that detects a position of the detecting body in a clamp state, wherein in a case where the clamp state is determined, the determination unit compares an output signal of the detecting body proximity sensor and a threshold value for generating a predetermined clamp force, to determine whether the clamping force is generated based on a comparison with the occurrence threshold value.

According to such a configuration, it is possible to easily and reliably determine whether or not the clamping force is generated (a state where a predetermined clamping force is generated on the workpiece) in the clamped state of the workpiece.

In the clamp device, a detection surface inclined with respect to an axis of the piston rod is formed in a portion of the detecting body facing the proximity sensor for the detecting body, and the threshold value setting unit sets the clamping force threshold value based on the output signal of the detecting body proximity sensor when a third operation is made to the setting operation section.

With such a configuration, it is possible to set the clamping force generation threshold easily without changing the position of the detecting body proximity sensor.

The clamp device may further include a clamping force generation lamp which is disposed so as to be visible from the outside and turned on when the determination unit determines that the clamping force generating state is established.

With such a configuration, the user can easily know that a predetermined clamping force is being generated on the workpiece by visually confirming the clamping force generation lamp.

The clamp device may further comprise a speed calculation unit configured to calculate an angular speed of the clamp arm based on an output signal of the cam surface proximity sensor; and a speed determination unit that determines whether the angular speed calculated by the speed calculation unit is equal to or less than a predetermined speed threshold value.

According to such a configuration, since the angular speed of the clamp arm is calculated using the output signal of the cam surface proximity sensor, even if a new sensor for detecting the angular speed of the clamp arm is not provided, it is possible to determine whether the angular speed of the arm is equal to or less than the speed threshold value.

The clamp device may further include a speed lamp which is arranged to be visually recognizable from the outside and turned on when it is determined by the speed determination unit that the angular speed exceeds the speed threshold value.

With such a configuration, the user can easily check whether the angular speed of the clamp arm is equal to or less than the speed threshold value by visually recognizing the speed lamp.

In the above-described clamp device, when the output signal of the cam surface proximity sensor is within an acceptable range for clamping defined by the clamp threshold value and the angular speed or angular acceleration of the clamp arm is zero, the clamp device may be determined as in the clamp state.

According to such a configuration, even if the clamp threshold value is set at a value deviated to the unclamp side from the output signal output from the cam surface proximity sensor in the complete clamp state (the state where the clamp arm is in contact with the workpiece and stopped), it is possible to reliably and easily determine the complete clamp state.

In the above clamp device, when the output signal of the cam surface proximity sensor falls within the acceptable range for clamping defined by the clamp threshold value and the angular speed or angular acceleration of the clamp arm is zero, it may be determined as the clamp state.

According to such a configuration, even in the case of damped vibration of the clamp arm in clamping a workpiece, it is possible to determine the complete clamp state reliably and easily.

In the above-described clamp device, when the output signal of the cam surface proximity sensor falls within the acceptable range for unclamping determined by the unclamp threshold value and the angular speed or the angular acceleration is zero, it may be determined as the unclamp state.

According to such a configuration, even if the unclamp threshold value is set at a value deviated to the clamp side from the output signal output from the cam surface proximity sensor in the complete unclamp state (the state where the clamp arm is stopped without contacting the workpiece), it is possible to reliably and easily determine the complete unclamp state.

In the above-described clamp device, when the output signal of the cam surface proximity sensor falls within the acceptable range for unclamping determined by the unclamp threshold value and the angular speed or the angular acceleration is zero, it may be determined as the unclamp state.

According to such a configuration, even in the case of damped vibration of the clamp arm in unclamping a workpiece, it is possible to determine the complete unclamp state reliably and easily.

The clamp device may further include a speed calculation unit that calculates the angular speed or the angular acceleration based on an output signal of the cam surface proximity sensor.

According to such a configuration, it is possible to acquire the angular speed or angular acceleration of the clamp arm easily without providing a new sensor for detecting the angular speed or angular acceleration of the clamp arm.

According to the present invention, since the cam surface proximity sensor detects the position of the cam surface of the cam portion provided on the rotatable shaft integrally rotating with the clamp arm, the rotating state of the clamp arm can be detected directly and highly accurately with a simple structure.

The above objects, features, and advantages will be readily understood from the following description of embodiments with reference to the accompanying drawings.

BRIEF DESCRIPTION OF DRAWINGS

FIG. 14A is a first timing chart for explaining the clamping operation of the clamp device shown in FIG. 11;

FIG. 14B is a second timing chart for explaining the unclamping operation of the clamp device;

DESCRIPTION OF EMBODIMENTS

Preferred embodiments of the clamp device according to the present invention will be described below with reference to the accompanying drawings. In the following description, the rotational direction (clockwise and counterclockwise) of the clamp arm will be described when viewed from the directions shown in FIGS. 3, 5, 7, and 9.

First Embodiment

Figure 1:
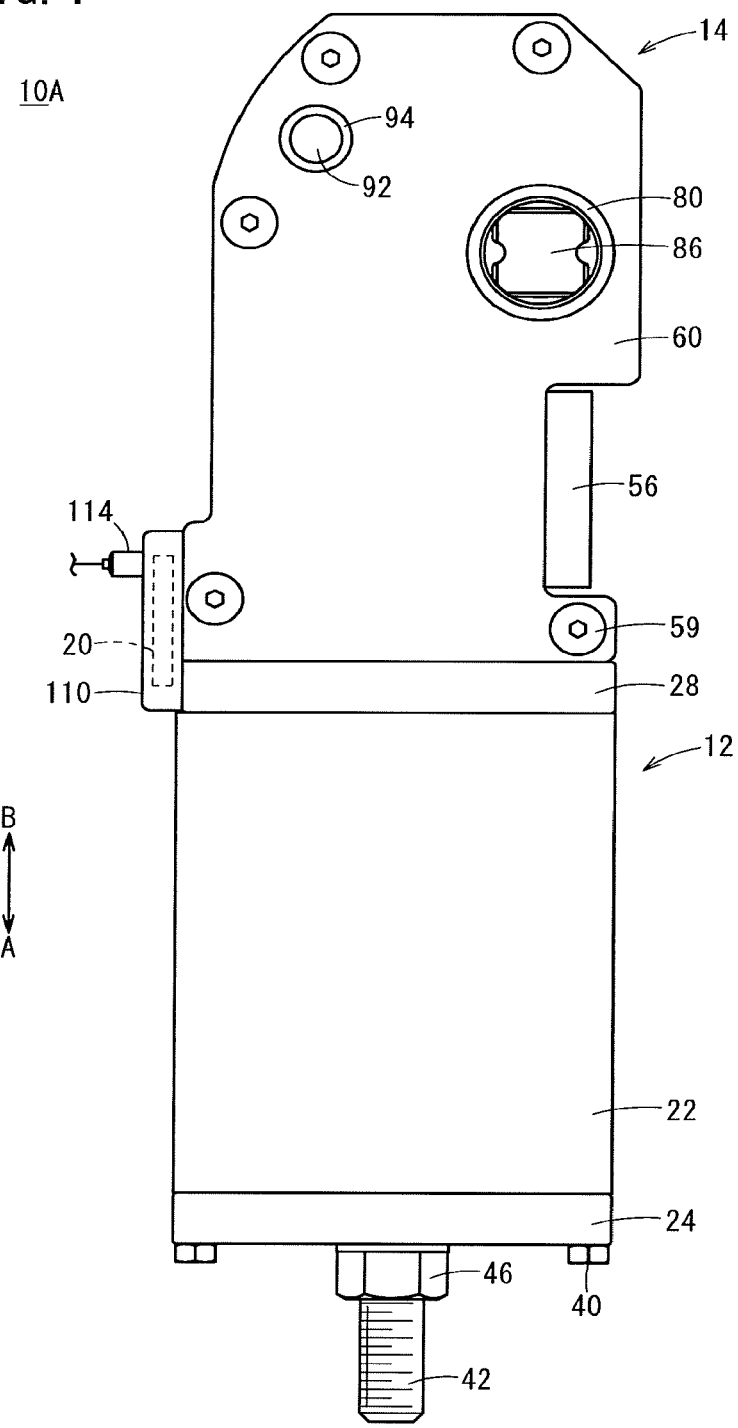
FIG. 1 is a front view of a clamp device according to a first embodiment of the present invention.
Figure 2:
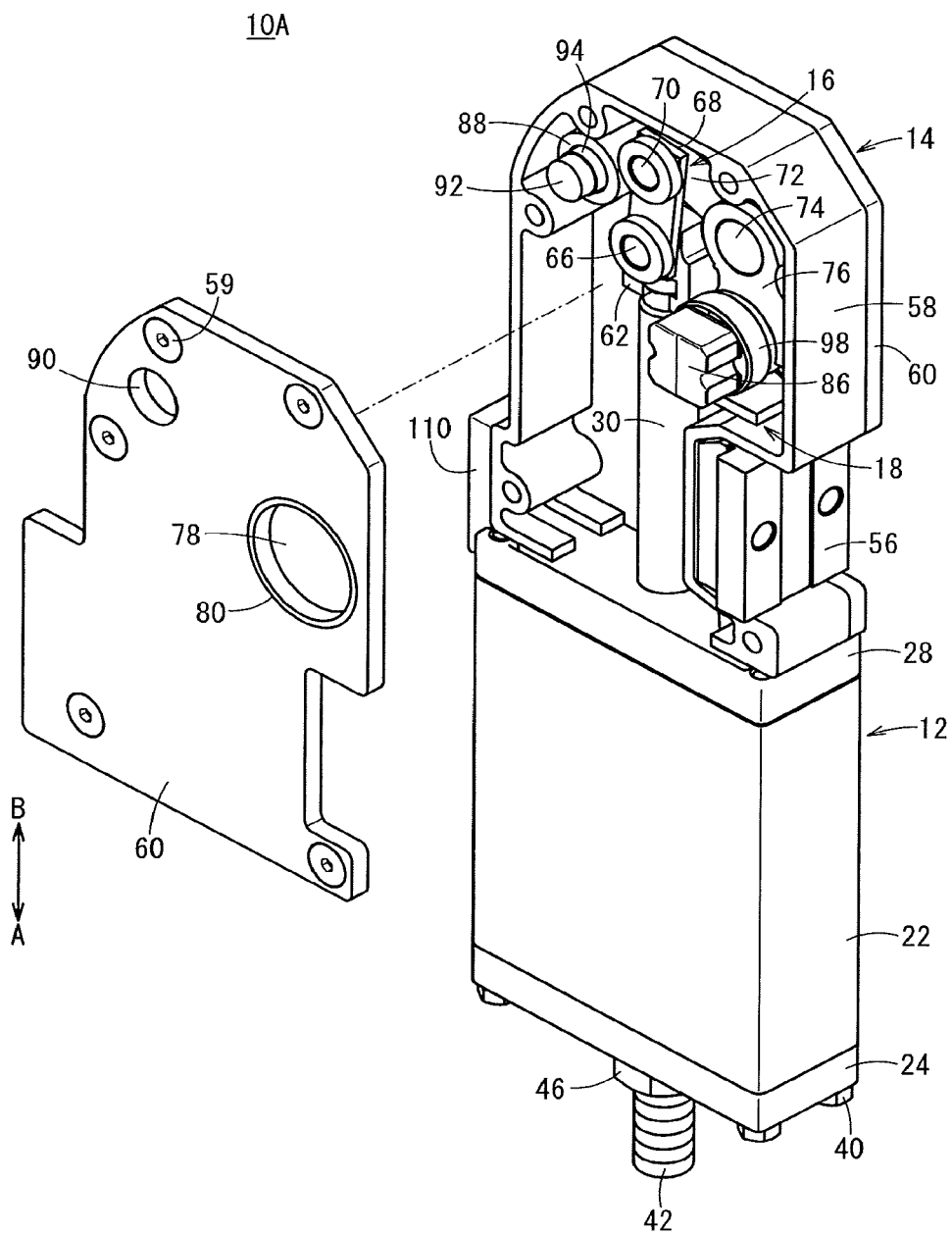
FIG. 2 is a partially exploded perspective view of the clamp device of FIG. 1.
Figure 3:
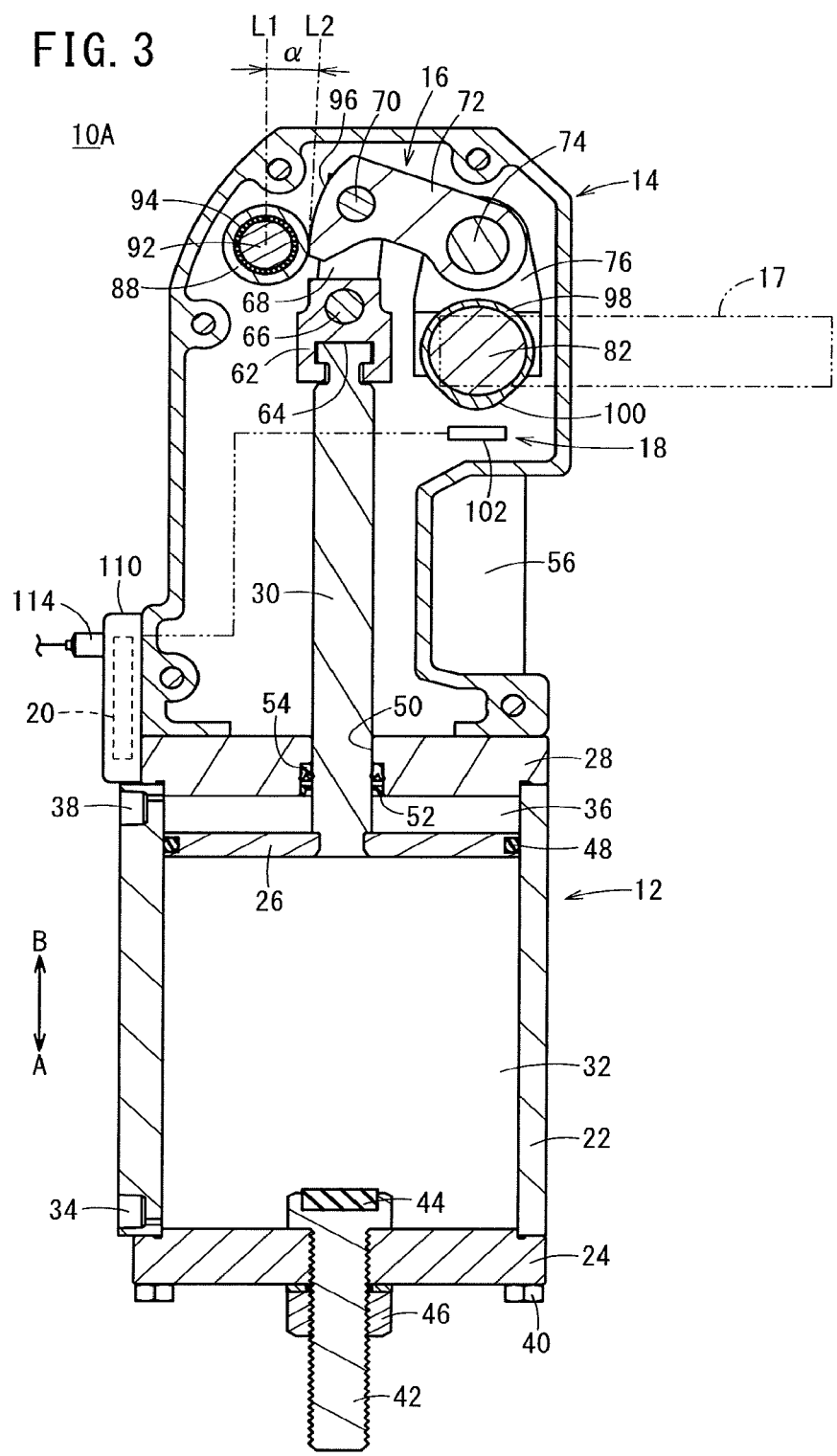
FIG. 3 is a longitudinal cross-sectional view showing the clamping state of the clamp device of FIG. 1.

As shown in FIGS. 1 to 3, a clamp device 10A according to a first embodiment of the present invention includes: a driving unit 12; a clamp body 14 connected to the driving unit 12; a link mechanism 16 arranged inside the clamp body 14; a clamp arm 17 which rotates through the link mechanism 16 under the action of the driving unit 12; a detecting portion 18 which detects a rotational position of the clamp arm 17; and a control unit 20.

The driving unit 12 is configured as a fluid pressure cylinder, and includes: a cylinder tube 22 configured in a flat tubular shape; an end block 24 that closes an opening in one end side (direction of the arrow A) of the cylinder tube 22; a piston 26 disposed displaceably in the axial direction in the cylinder tube 22; a rod cover 28 for closing an opening in the other end side (direction of the arrow B) of the cylinder tube 22; and a piston rod 30 connected to the piston 26.

The cylinder tube 22 is not limited to a flat tubular shape but may be of any shape such as a true cylindrical shape or an elliptical cylindrical shape. The cylinder tube 22 is provided with a first port 34 communicating with a first cylinder chamber 32 formed between the end block 24 and the piston 26, and a second port 38 communicating with a second cylinder chamber 36 formed between the piston 26 and the rod cover 28.

A tube (not shown) for supplying and discharging a compressed fluid (driving fluid) for reciprocating the piston 26 is connected to the first port 34 and the second port 38. The end block 24, the cylinder tube 22, and the rod cover 28 are integrally connected by a plurality of fastening bolts 40.

An adjusting bolt (rotation angle range adjustment mechanism) 42 for adjusting the rotation angle range of the clamp arm 17 is screwed to the substantial center portion of the end block 24 by adjusting the stroke of the piston 26. The projecting length of the first cylinder chamber 32 can be adjusted under the screwing action of the adjusting bolt 42. A damper 44 for damping an impact or impact noise of the piston 26 is mounted on a head positioned within the first cylinder chamber 32. The adjusting bolt 42 is fixed to the end block 24 by screwing the lock nut 46.

An annular piston packing 48 is mounted in a groove in the outer peripheral surface of the piston 26. One end side of the piston rod 30 is fixed to the center of the piston 26. A rod hole 50 through which the piston rod 30 is inserted is formed in a central portion of the rod cover 28. An annular rod packing 52 and an annular dust seal 54 are respectively attached to the wall surface defining the rod hole 50 via a groove.

The clamp body 14 is connected to the other end side of the rod cover 28, and is configured to include, for example, a metal material such as iron, stainless steel, aluminum, or the like. The clamp body 14 is provided with a bracket 56 for attaching the clamp device 10A to a fixed member (not shown).

As shown in FIG. 2, the clamp body 14 includes a frame portion 58 having openings on both sides, a pair of cover portions 60 fastened to the frame portion 58 by a plurality of screw members 59 so as to close the opening of the frame portion 58. As a result, a chamber in which the other end side of the piston rod 30 and the link mechanism 16 can be disposed is formed in the clamp body 14. A knuckle joint 62 is connected to the other end portion of the piston rod 30.

In the knuckle joint 62, a groove portion 64 having a substantially T-shaped cross section and extending in a direction orthogonal to the axial direction of the piston rod 30 is formed, so that the other end portion of the piston rod 30 is mounted. Further, in the knuckle joint 62, there is formed a hole portion through which a knuckle pin 66 extending along a direction orthogonal to the cover portion 60 (a direction orthogonal to the paper surface of FIG. 3) is inserted.

The link mechanism 16 converts the reciprocating motion of the piston 26 into a rotating motion of the rotatable shaft 82 described later. The link mechanism 16 includes a first link portion 68 rotatably provided on the knuckle joint 62 via a knuckle pin 66, a second link portion 72 rotatably provided on the first link portion 68 via the first pin 70 and a support lever 76 rotatably provided on the second link portion 72 via the second pin 74.

In the first link portion 68, a hole portion through which the knuckle pin 66 is inserted and a hole portion through which the first pin 70 is inserted are formed so as to be separated from each other. In the second link portion 72, a hole portion through which the first pin 70 is inserted and a hole portion through which the second pin 74 is inserted are formed so as to be separated from each other.

A rotatable shaft 82 supported by a bearing 80 inserted through a hole portion 78 of the cover portion 60 is fixed to the support lever 76. The first pin 70, the second pin 74, and the rotatable shaft 82 are arranged parallel to the knuckle pin 66. An arm-supporting portion 86 to which the clamp arm 17 is attached is fixed to an end portion of the rotatable shaft 82. That is, the rotatable shaft 82 rotates integrally with the clamp arm 17.

The linear motion of the piston rod 30 is transmitted to the knuckle joint 62, the first link portion 68, the second link portion 72, and the support lever 76, and the support lever 76 is rotated and displaced by a predetermined angle together with the rotatable shaft 82. Thus, the clamp arm 17 disposed via the arm-supporting portion 86 on the rotatable shaft 82 rotates.

Further, in the present embodiment, a guide roller 88 is provided near the link mechanism 16. The guide roller 88 is rotatably provided to a pin member 92 inserted through a hole 90 of the clamp body 14 via a plurality of rolling elements 94. Then, the predetermined working surface 96 of the second link portion 72 comes into contact under the rotation operation of the second link portion 72 constituting the link mechanism 16, whereby the guide roller 88 rotates.

The working surface 96 of the second link portion 72 is formed so that the contact angle α between the working surface 96 and the guide roller 88 is constant while it is in contact with the guide roller 88. Here, the contact angle α is an angle formed between a line segment L1 orthogonal to the axis of the guide roller 88 and a tangent line L2 on the working surface 96 of the guide roller 88 in a state parallel to the axis of the piston rod 30.

As a result, while the working surface 96 of the second link portion 72 is in contact with the guide roller 88, a substantially constant clamping force can be continuously generated against the workpiece. In other words, the effective range (the width of the rotation angle of the clamp arm 17) in which a predetermined clamping force can be generated on the workpiece can be made relatively broad. This makes it possible to generate a predetermined clamping force on the workpiece without unnecessarily increasing the cylinder fluid pressure even when the dimensional variation of the workpiece is relatively large.

The detecting portion 18 has a cam portion 98 fixed to the outer peripheral surface of the rotatable shaft 82 and a proximity sensor (a cam surface proximity sensor) 102 for detecting the position of the cam surface 100 of the cam portion 98. The cam portion 98 is formed so that the radial distance from the center of the rotatable shaft 82 to the cam surface 100 varies along the circumferential direction. Further, the cam portion 98 is made of a metal material which generates eddy current loss of iron or the like.

Figure 4:
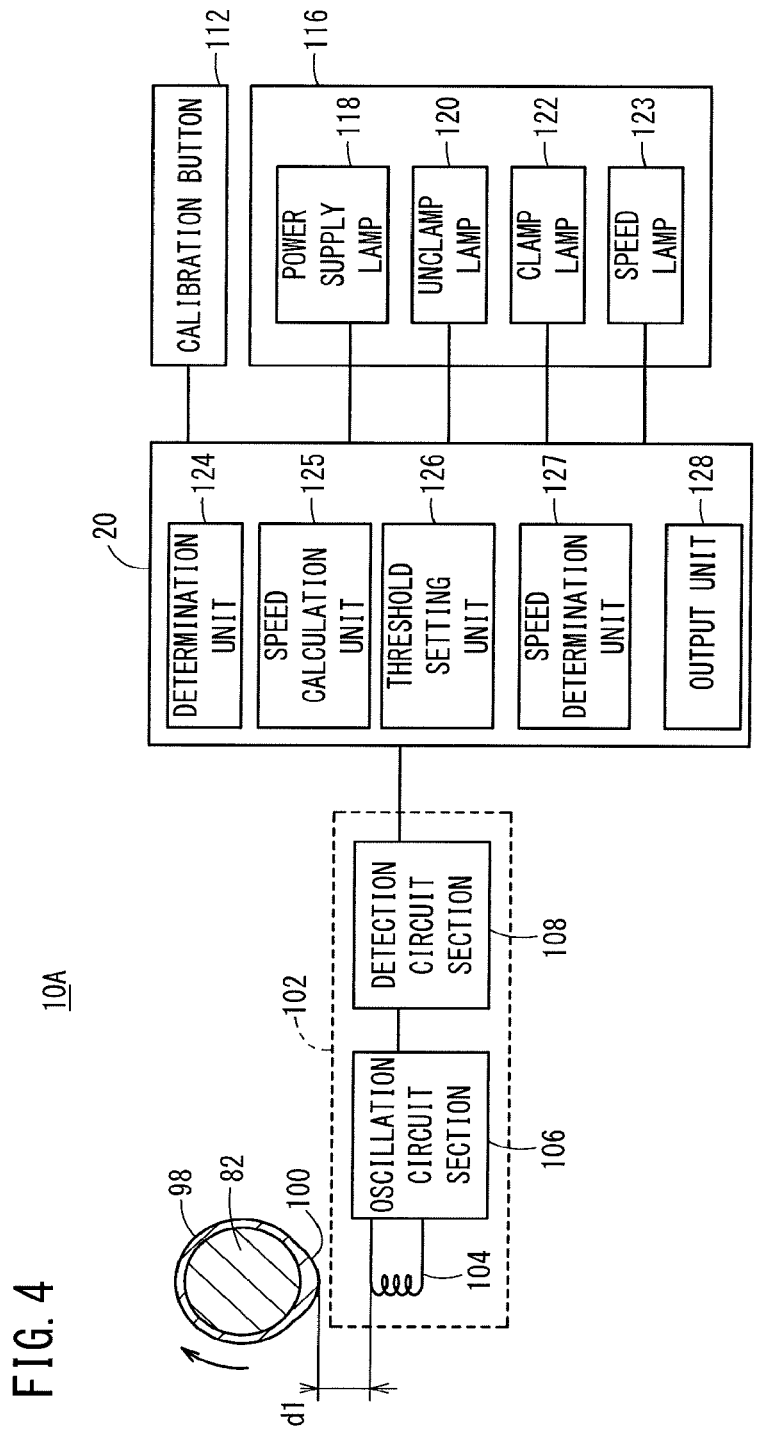
FIG. 4 is a block diagram of the clamp device according to the first embodiment.

As shown in FIG. 4, in the present embodiment, the proximity sensor 102 is configured as an induction-type proximity sensor, and includes a detection coil 104 disposed in the vicinity of the cam surface 100, an oscillation circuit section 106 electrically connected to the detection coil 104, and a detection circuit section 108 electrically connected to the oscillation circuit section 106.

The detection coil 104 is disposed so that its coil surface faces the cam surface 100. The oscillation circuit section 106 oscillates and drives the detection coil 104 at a predetermined oscillation frequency. The detection circuit section 108 detects the resonance impedance based on the output signal of the oscillation circuit section 106. That is, the proximity sensor 102 detects the change in the distance d1 between the cam surface 100 and the detection coil 104, which is caused by the rotation of the rotatable shaft 82, as a change in the resonance impedance, whereby the position of the cam surface 100 (the rotation position of the clamp arm 17) is detected.

The control unit 20 is accommodated in a casing 110 (see FIG. 3) provided in the clamp body 14, and the proximity sensor 102 is electrically connected by a lead wire or the like. The casing 110 is provided with a calibration button (setting operation section) 112 which can be pressed from the outside by a user, a connector 114 to which a cable or the like connected to an external device (power supply or the like) can be connected, and a display unit 116 viewable from the outside. The display unit 116 includes a power supply lamp 118, an unclamp lamp 120, a clamp lamp 122, and a speed lamp 123.

The control unit 20 includes a determination unit 124, a speed calculation unit 125, a speed determination unit 127, a threshold value setting unit 126, and an output unit 128.

The determination unit 124 determines whether or not the clamp state is established based on a comparison between the resonance impedance (hereinafter referred to as detected resonance impedance Z1) detected by the detection circuit section 108 of the proximity sensor 102 and the clamp threshold value Za. The determination unit 124 determines whether it is in the unclamp state based on a comparison between the detected resonance impedance Z1 and the unclamp threshold value Zb.

The speed calculation unit 125 calculates the angular speed of the clamp arm 17 (the rotatable shaft 82) based on the detected resonance impedance Z1. Specifically, the speed calculation unit 125 calculates the angular speed by constantly differentiating the detected resonance impedance Z1 (using a difference). The speed determination unit 127 determines whether the angular speed of the clamp arm 17 calculated by the speed calculation unit 125 is equal to or less than the speed threshold value. It should be noted that the speed threshold value is stored in advance in the storage unit (not shown) of the control unit 20. Further, the speed determination unit 127 may determine whether the angular speed of the clamp arm 17 calculated by the speed calculation unit 125 is greater than the speed threshold value.

The threshold value setting unit 126 sets the clamp threshold value Za based on the output signal (detected resonance impedance Z1) of the detection circuit section 108 when the calibration button 112 is operated for the first time. Further, the threshold value setting unit 126 sets the unclamp threshold value Zb based on the detected resonance impedance Z1 when the calibration button 112 is subjected to the second operation.

The clamp threshold value Za and the unclamp threshold value Zb set by the threshold value setting unit 126 are stored in the storage unit. The output unit 128 turns on or turns off the unclamp lamp 120, the clamp lamp 122, and the speed lamp 123.

Figure 5:
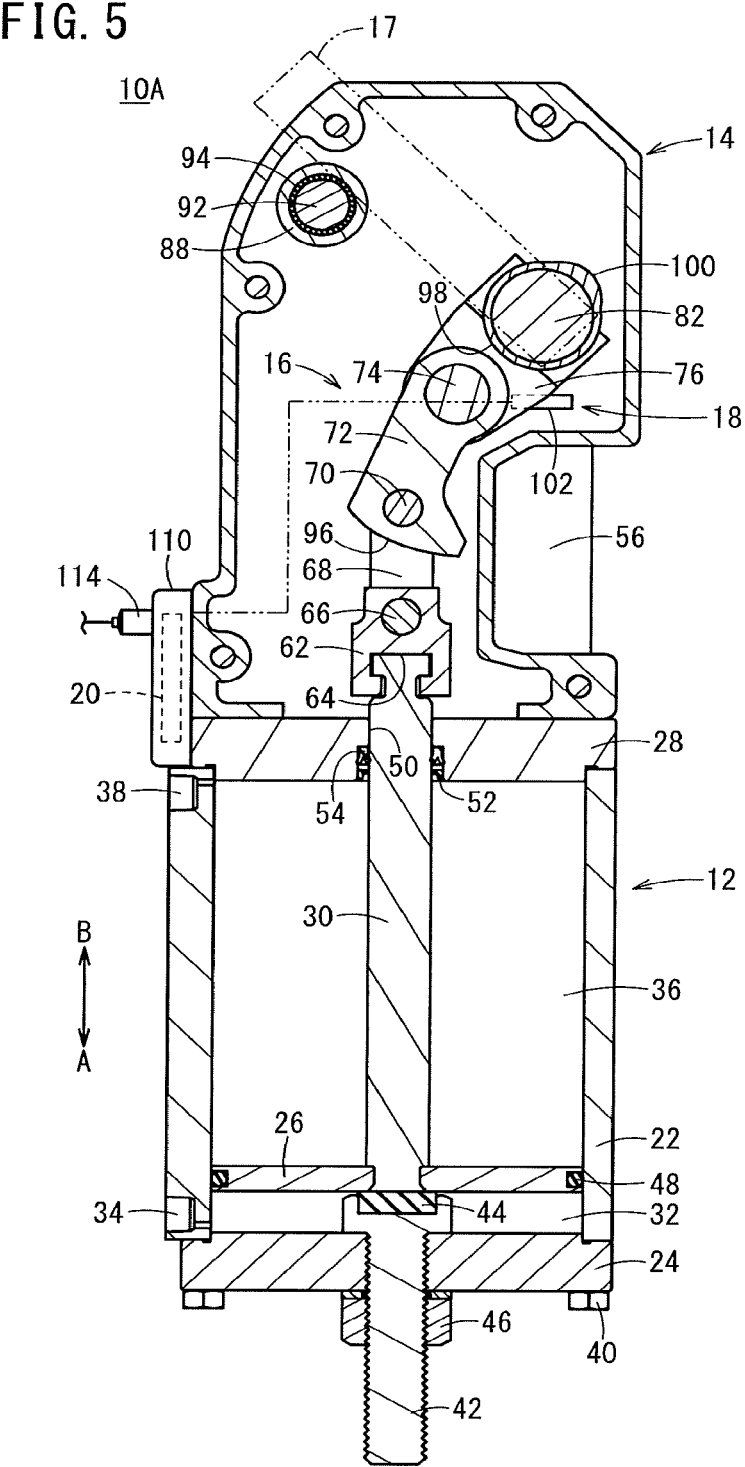
FIG. 5 is a longitudinal cross-sectional view showing the unclamp state of the clamp device of FIG. 3.

The clamp device 10A according to the present embodiment is basically configured as described above, and the operation and effects thereof will now be described. It is assumed that the unclamp state shown in FIG. 5 is the initial state, and in this initial state, the clamp threshold value Za and the unclamp threshold value Zb are set and stored in the storage unit.

First, the user attaches the bracket 56 of the clamp device 10A to a fixed member (not shown). Further, by connecting the cable to the connector 114, the clamp device 10A is connected to an external device (power source or the like). As a result, power is supplied to the control unit 20, and the power lamp 118 is turned on. In the initial state, the unclamp lamp 120 is turned on, the clamp lamp 122 and the speed lamp 123 are turned off, and the piston 26 is positioned on one end side of the cylinder tube 22 and is in contact with the damper 44.

When clamping the workpiece, the compressed fluid is supplied to the first port 34 with the second port 38 open to the atmosphere. Then, as shown in FIG. 3, the piston 26 is displaced toward the rod cover 28 (direction of the arrow B). The linear motion of the piston 26 is transmitted to the link mechanism 16 via the piston rod 30 and the knuckle joint 62, and the rotatable shaft 82 and the clamp arm 17 are integrally rotated in a clockwise direction, under the rotational action of the support lever 76 constituting the link mechanism 16.

Figure 6:
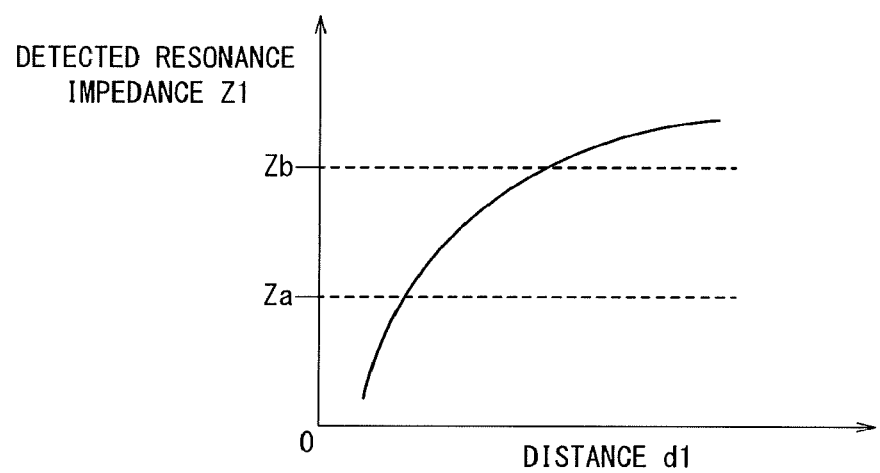
FIG. 6 is a graph showing the relationship between the distance between the cam surface of the cam portion of FIG. 3 and the detection coil and the detected resonance impedance.

At this time, since the cam portion 98 fixed to the rotatable shaft 82 also rotates integrally with the rotatable shaft 82, the distance d1 between the cam surface 100 and the detection coil 104 becomes short and the detected resonance impedance Z1 becomes small (see FIG. 6).

When the detected resonance impedance Z1 is larger than the unclamp threshold value Zb, the determination unit 124 determines the unclamp state. At this time, the output unit 128 continues to turn on the unclamp lamp 120.

When the piston 26 further displaces toward the rod cover 28 while the rotatable shaft 82 further rotates and the detected resonance impedance Z1 becomes equal to or larger than the clamp threshold value Za and equal to or less than the unclamp threshold value Zb, the determination unit 124 determines an intermediate state (a transition state from the unclamp state to the clamp state). When the determination unit 124 determines that the state is an intermediate state, the output unit 128 turns off the unclamp lamp 120. As a result, the user can confirm that the workpiece is in an intermediate state by visually confirming the unclamp lamp 120 and the clamp lamp 122 turned off.

Subsequently, when the clamp arm 17 contacts the workpiece by further rotation of the rotatable shaft 82 and the detected resonance impedance Z1 becomes smaller than the clamp threshold value Za, the determination unit 124 determines the clamp state. When the determination unit 124 determines the clamp state, the output unit 128 turns on the clamp lamp 122 with the unclamp lamp 120 turned off. As a result, the user can confirm that the workpiece is in the clamp state by viewing the clamp lamp 122 turned on.

Further, the speed-calculating unit 125 calculates the angular speed (clamping speed) of the clamp arm 17 at the point in time when the detected resonance impedance Z1 reaches the clamp threshold value Za (or immediately before the point). Then, the speed determination unit 127 determines whether the clamping speed is equal to or less than the speed threshold (clamping speed threshold).

When the speed determination unit 127 determines that the clamping speed exceeds the clamping speed threshold value, the output unit 128 turns on the speed lamp 123. This allows the user to adjust the supply rate of the compressed fluid to an appropriate clamping speed. Therefore, it is possible to prevent the clamping speed from becoming excessively large, the clamp arm 17 and the workpiece etc. from being scratched, and the components (for example, the link mechanism 16, etc.) of the clamp device 10A from being damaged.

In this clamp state, the piston 26 is further displaced toward the rod cover 28 and the working surface 96 of the second link portion 72 contacts the guide roller 88, whereby a predetermined clamping force is generated on the workpiece. Substantially constant clamping force is maintained on the workpiece until the displacement of the piston 26 toward the rod cover 28 side is stopped.

On the other hand, when releasing the clamped state of the workpiece, the compressed fluid is supplied to the second port 38 while the first port 34 is open to the atmosphere. Then, as shown in FIG. 5, the piston 26 is displaced to the end block 24 side. The linear motion of the piston 26 is transmitted to the link mechanism 16 via the piston rod 30 and the knuckle joint 62, and the rotatable shaft 82 and the clamp arm 17 rotate integrally in a counterclockwise direction, under the rotational action of the support lever 76 constituting the link mechanism 16.

At this time, since the cam portion 98 fixed to the rotatable shaft 82 also rotates integrally with the rotatable shaft 82, the distance d1 between the cam surface 100 and the detection coil 104 increases and the detected resonance impedance Z1 increases (See FIG. 6).

When the detected resonance impedance Z1 becomes equal to or larger than the clamp threshold value Za and equal to or less than the unclamp threshold value Zb, the determination unit 124 determines an intermediate state (a transition state from the clamped state to the unclamp state). When the determination unit 124 determines the intermediate state, the output unit 128 turns off the clamp lamp 122. As a result, the user can confirm that the workpiece is in the intermediate state by visually confirming the unclamp lamp 120 and the clamp lamp 122 turned off.

Subsequently, when the detected resonance impedance Z1 becomes larger than the unclamp threshold value Zb due to further displacement of the piston 26 toward the end block 24 side, the determination unit 124 determines the unclamp state. When the determination unit 124 determines the unclamp state, the output unit 128 turns on the unclamp lamp 120 with the clamp lamp 122 turned off.

As a result, the user can confirm that the workpiece is in the unclamp state by viewing the unclamp lamp 120 turned on. Thereafter, as the piston 26 contacts the damper 44, the displacement of the piston 26 toward the end block 24 side is stopped, and the rotation of the rotatable shaft 82 and the clamp arm 17 is stopped.

Further, the speed calculating unit 125 calculates the angular speed (unclamping speed) of the clamp arm 17 at the time point when the detected resonance impedance Z1 reaches the unclamp threshold value Zb (or immediately before the point). Then, the speed determination unit 127 determines whether the unclamping speed is equal to or less than the speed threshold (unclamping speed threshold). It should be noted that the unclamping speed threshold value may be the same as or different from the clamping speed threshold value.

When it is determined by the speed determination unit 127 that the unclamping speed exceeds the unclamping speed threshold value, the output unit 128 turns on the speed lamp 123. This allows the user to adjust the supply rate of the compressed fluid to achieve an appropriate unclamping speed. Therefore, it is possible to prevent the unclamping speed from becoming excessively large, and the components (for example, the link mechanism 16, etc.) of the clamp device 10A from being damaged.

In the above-described clamp device 10A, for example, adjustment of the rotation angle range of the clamp arm 17 and setting of the clamp threshold value Za and the unclamp threshold value Zb are performed according to the shape and size of the workpiece.

When adjusting the rotation angle range of the clamp arm 17, the projecting length of the adjusting bolt 42 to the first cylinder chamber 32 is changed by screwing the adjusting bolt 42. As a result, the stroke length of the piston 26 is changed, so that the rotation angle range of the rotatable shaft 82 and the clamp arm 17, which rotate via the link mechanism 16 under the action of the linear motion of the piston 26, is changed.

When it is desired to broaden the rotation angle range of the clamp arm 17, a protruding length of the adjusting bolt 42 to the first cylinder chamber 32 is adjusted to be small. When it is desired to narrow the rotation range of the clamp arm 17, the protruding length of the adjusting bolt 42 to the first cylinder chamber 32 is increased.

When changing the clamp threshold value Za, the piston 26 is displaced toward the rod cover 28 under the action of the fluid pressure, so that the workpiece is clamped by bringing the clamp arm 17 into contact with the workpiece. Then, in this state, the user continuously presses (holds down) the calibration button 112 for a predetermined time (for example, 3 seconds) or more (first operation). As a result, the new clamp threshold value Za is set based on the value of the detected resonance impedance Z1 at this time, and stored in the storage unit of the control unit 20.

Further, when changing the unclamp threshold value Zb, the user presses (taps on) the calibration button 112 for less than a predetermined time (for example, about 1 second) while the clamp arm 17 is positioned at a predetermined rotation angle (unclamping angle) (second operation). As a result, a new unclamp threshold value Zb is set based on the value of the detected resonance impedance Z1 at this time, and stored in the storage unit of the control unit 20.

As described above, even when changing the shape and size of the workpiece, by pressing the calibration button 112 with the clamp arm 17 positioned at the predetermined rotation angle, the clamp threshold value Za and the unclamp threshold value Zb can be reset easily. By changing the pressing time of the calibration button 112, it is possible to set both the clamp threshold value Za and the unclamp threshold value Zb with one calibration button 112.

According to the present embodiment, since the position of the cam surface 100 of the cam portion 98 provided on the rotatable shaft 82 integrally rotating with the clamp arm 17 is detected by the proximity sensor 102, the rotating state of the clamp arm 17 can be directly and highly accurately detected with a simple configuration.

Further, based on a comparison between the output signal (detected resonance impedance Z1) of the proximity sensor 102 and the clamp threshold value Za, the determination unit 124 determines the clamped state of the workpiece. For comparison between the detected resonance impedance Z1 and the unclamp threshold value Zb, the determination unit 124 determines the unclamped state of the workpiece. Therefore, it is possible to determine the clamped state and the unclamped state easily and reliably.

Furthermore, since the clamp threshold value Za and the unclamp threshold value Zb are set based on the detected resonance impedance Z1 when the calibration button 112 is pressed, it is possible to easily set the clamp threshold value Za and the unclamp threshold value Zb.

Furthermore, by adjusting the protruding length of the adjusting bolt 42 to the first cylinder chamber 32 by screwing the adjusting bolt 42, the rotation angle range of the clamp arm 17 (the maximum opening angle on the unclamp side of the clamp arm 17) can be adjusted.

In the present embodiment, the cam portion 98 is made of a metal material and the proximity sensor 102 is an induction type proximity sensor. Thus, for example, as compared with the case where the magnetic detection sensor is used as the proximity sensor 102, the sensitivity of the DC magnetic field generated at the time of welding is low, so even when the clamp device 10A is used in the welding environment, it is possible to operate the proximity sensor 102 more stably.

In addition, since the proximity sensor 102 is disposed in the clamp body 14 including a metal, the magnetic shield effect makes it less likely to be affected by the DC magnetic field generated at the time of welding. Furthermore, the clamp device 10A can be downsized, as compared with the case where the proximity sensor 102 is disposed outside the clamp body 14.

Furthermore, since the clamp lamp 122 and the unclamp lamp 120 are provided so as to be visible from the user, it is possible to easily confirm the clamped state and the unclamp state of the workpiece.

In the present embodiment, the angular speed (clamping speed and unclamping speed) of the clamp arm 17 is calculated using the output signal of the proximity sensor 102. Therefore, even without providing a new sensor for detecting the angular speed of the clamp arm 17, it can be determined with a simple configuration whether the angular speed of the clamp arm 17 is equal to or less than the speed threshold value.

Second Embodiment

Next, a clamp device 10B according to a second embodiment of the present invention will be described. In the second embodiment, the same reference numerals are given to the constituent elements having the same actions and effects as those of the constituent elements of the clamping apparatus 10A according to the first embodiment, and a detailed description thereof will be omitted. This also applies to the third embodiment to be described later.

Figure 7:
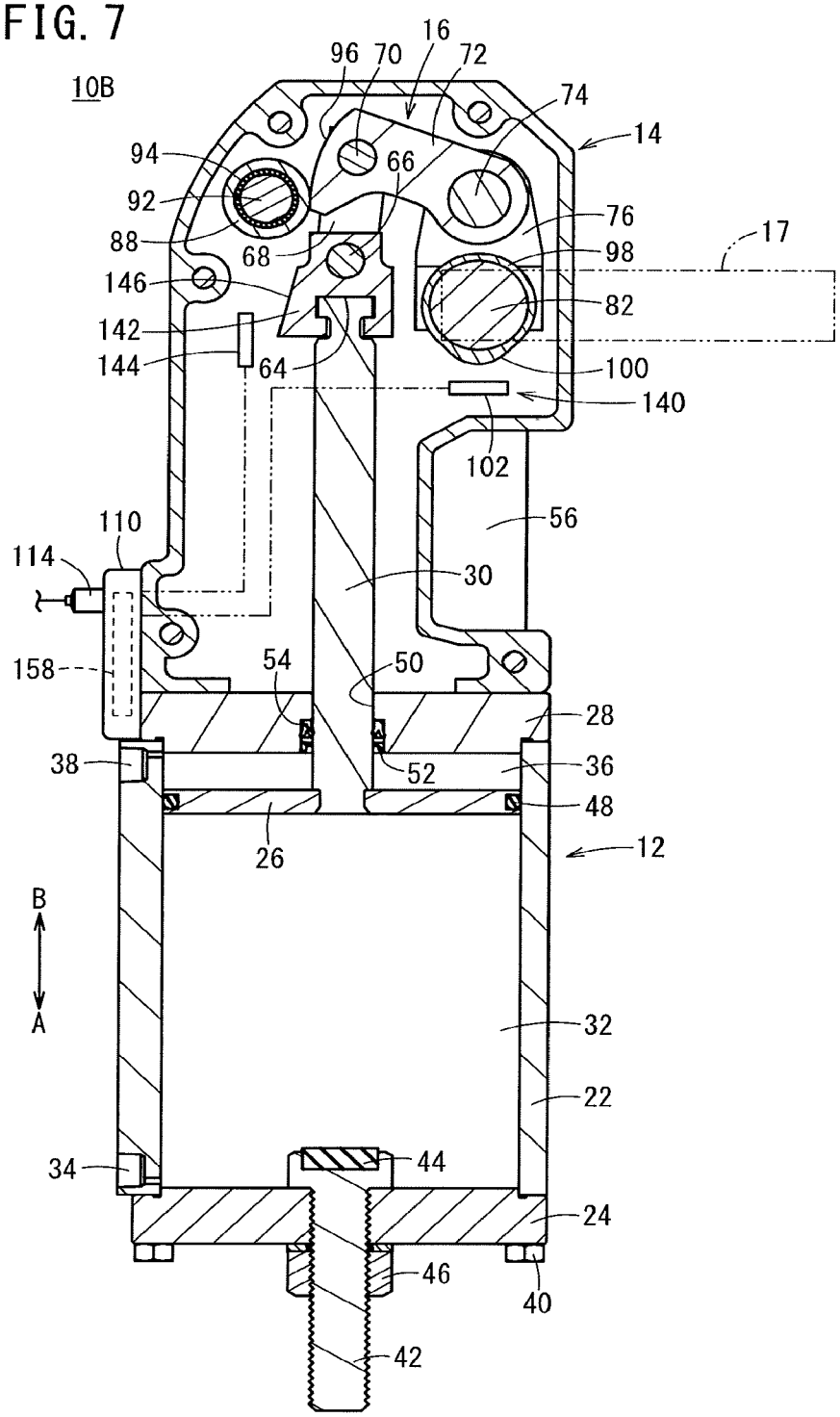
FIG. 7 is a longitudinal cross-sectional view showing a clamping state of the clamp device according to the second embodiment of the present invention.

As shown in FIG. 7, the detecting portion 140 of the clamp device 10B according to the present embodiment includes a knuckle joint (a detecting body) 142 that is displaced in stroke together with the piston rod 30, and a proximity sensor (a proximity sensor for a detecting body) 144.

The knuckle joint 142 is made of a metal material that generates an eddy current loss of iron or the like. In the clamped state of the workpiece, a detection surface 146 which is inclined toward the side on which the rotatable shaft 82 is located (the right side in FIG. 7) is formed on a portion of the knuckle joint 142 oriented toward the opposite side from the rotatable shaft 82 (the left side in FIG. 7) is rotated in a direction (the direction of the arrow B) where the first link portion 68 is located.

Figure 8:
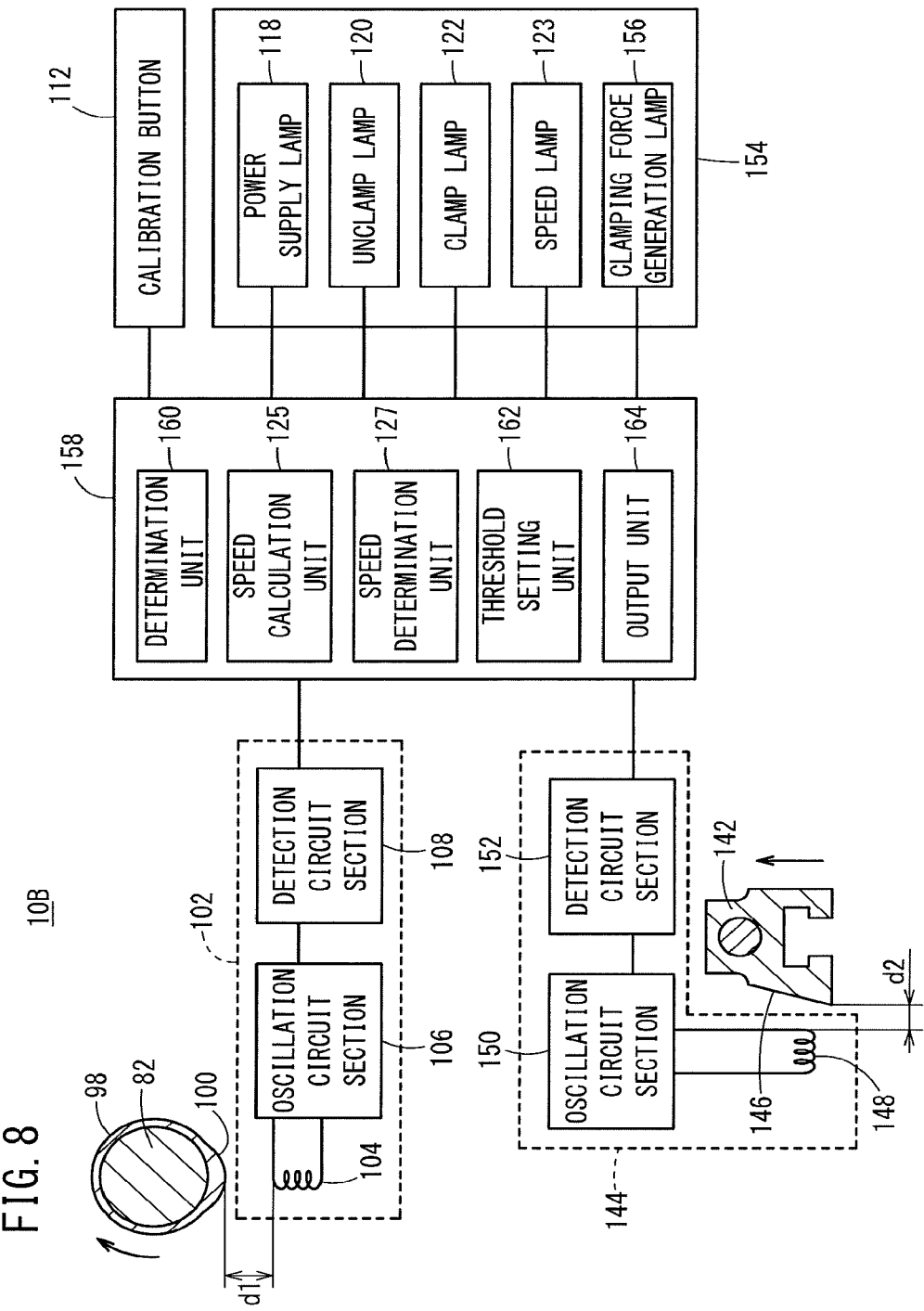
FIG. 8 is a block diagram of a clamp device according to the second embodiment.
Figure 9:
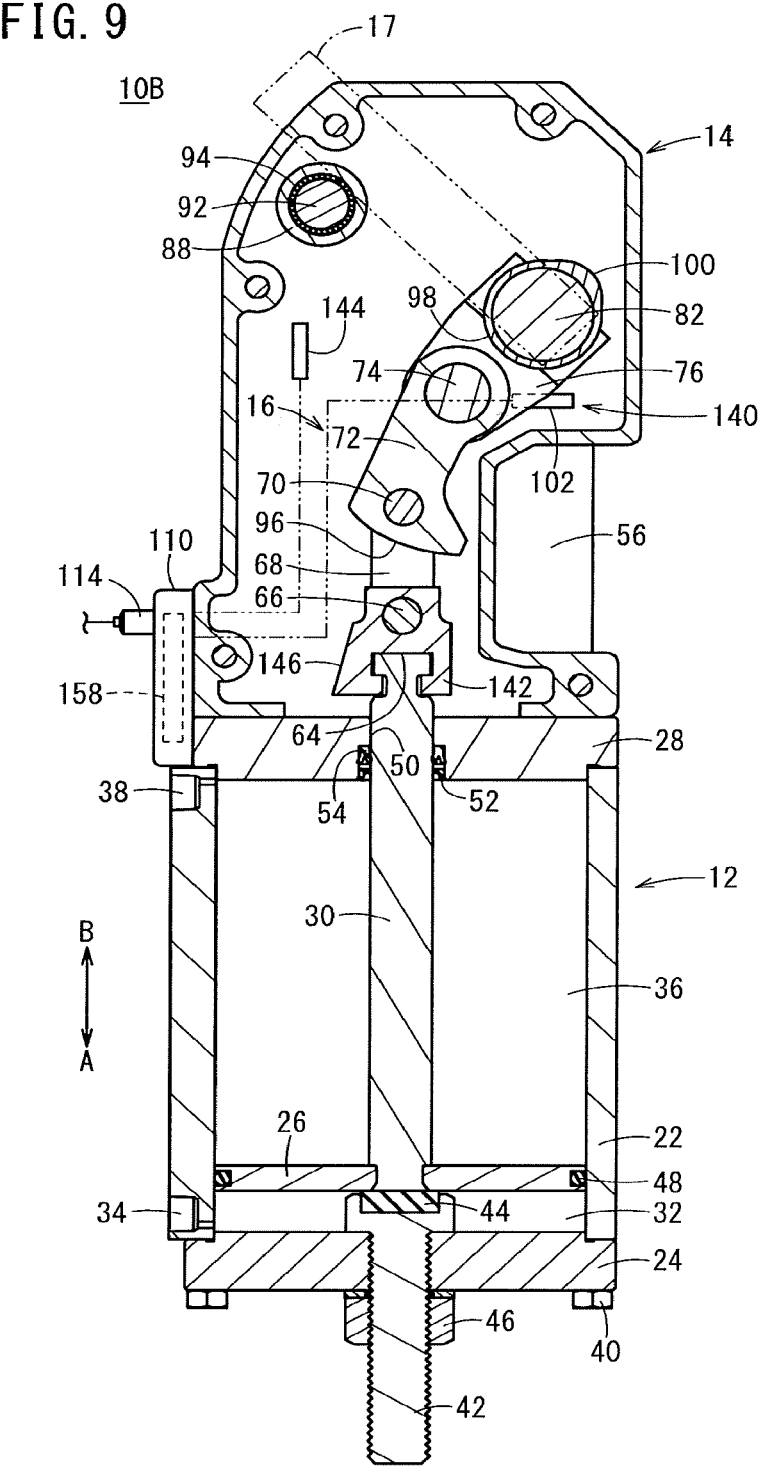
FIG. 9 is a vertical cross-sectional view showing the unclamp state of the clamp device of FIG. 7.

The proximity sensor 144 is disposed in the clamp body 14 and detects the position of the detection surface 146 of the knuckle joint 142 in the clamped state of the workpiece. As shown in FIG. 8, the proximity sensor 144 is an induction-type proximity sensor having a detection coil 148, an oscillation circuit section 150, and a detection circuit section 152, and is configured similarly to the above-described proximity sensor 102.

In this way, since the knuckle joint 142 is made of a metal material and the proximity sensor 144 configured as an induction-type proximity sensor is disposed in the clamp body 14 having the magnetic shielding effect, the direct current, the proximity sensor 144 is less susceptible to the influence of the magnetic field and can operate more stably.

The detection coil 148 is disposed so that the coil surface thereof is close to and faces the detection surface 146 of the knuckle joint 142 in the clamped state of the workpiece. That is, the proximity sensor 144 detects the change in the distance d2 between the detection surface 146 and the detection coil 148 due to the reciprocating motion of the piston 26 as a change in the resonance impedance. Accordingly, the position of the detection surface 146 in the clamped state of the workpiece is detected.

The display unit 154 includes a clamping force generation lamp 156 that is visible from the outside. When the clamping state is determined, the determination unit 160 of the control unit 158 determines whether the clamping force is generated based on a comparison between the output signal of the proximity sensor 144 and a predetermined clamping force generation threshold value Zc.

The threshold value setting unit 162 sets predetermined clamp threshold value Za, unclamp threshold value Zb, and clamping force generating threshold value Zc. Specifically, the threshold value setting unit 162 sets the value of the detected resonance impedance Z2 of the proximity sensor 144 at this time as the clamping force generation threshold value Zc, by pressing the calibration button 112 two times in a row (third operation) while the clamp arm 17 clamps the workpiece with a predetermined clamping force. In this way, the clamping force generation threshold value Zc can be easily changed depending on the shape and size of the workpiece to be clamped. The clamping force generation threshold value Zc set by the threshold value setting unit 162 is stored in a storage unit (not shown) of the control unit 158.

As described above, in the present embodiment, it is possible to set all of the clamp threshold value Za, the unclamp threshold value Zb, and the clamping force generation threshold value Zc with one calibration button 112. The output unit 164 turns on the clamping force generation lamp 156 when the determination unit 160 determines that the clamping force is generated.

In the clamp device 10B according to the present embodiment, when the piston 26 is displaced toward the rod cover 28 under the action of fluid pressure, the piston rod 30 and the knuckle joint 142 are displaced toward the first link portion 68 (in the direction of the arrow B), the rotatable shaft 82 and the clamp arm 17 integrally rotate in the clockwise direction.

When the knuckle joint 142 is displaced to a position facing the detection coil 148 of the proximity sensor 144, the detection resonance impedance Z2 is output from the detection circuit section 152 of the proximity sensor 144 to the control unit 158.

When the determination unit 160 determines that the workpiece is in the clamped state based on the detected resonance impedance Z1 of the proximity sensor 102, the determination unit 160 determines whether the clamp force is generated, based on the comparison between the detected resonance impedance Z2 of the proximity sensor 144 and the clamping force generation threshold value Zc. That is, when the detected resonance impedance Z2 is equal to or larger than the clamp force generation threshold Zc, the determination unit 160 determines that a predetermined clamping force is not exerted on the workpiece.

Figure 10:
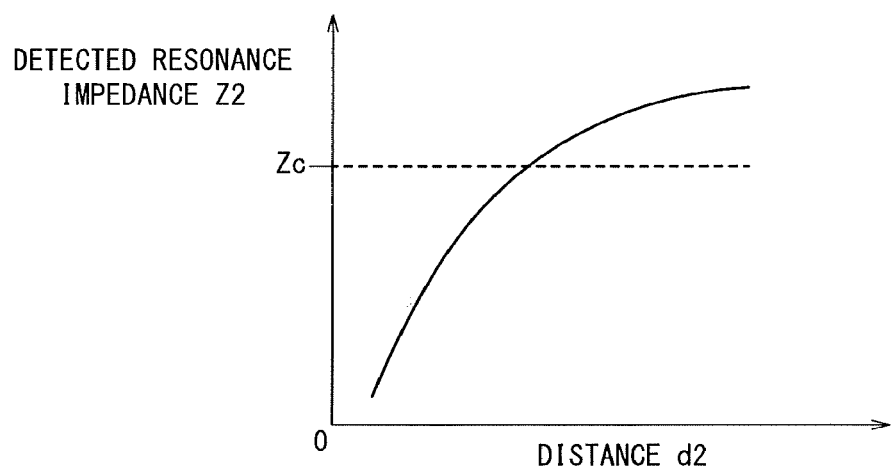
FIG. 10 is a graph showing the relationship between the distance between the detection surface and the detection coil and the detected resonance impedance.

Subsequently, the piston 26 is further displaced toward the rod cover 28, so that the distance d2 between the detection surface 146 of the knuckle joint 142 and the detection coil 148 of the proximity sensor 144 becomes short and the detected resonance impedance Z2 decreases (see FIG. 10). Then, when the detected resonance impedance Z2 becomes smaller than the clamping force generation threshold value Zc, the determination unit 160 determines that the clamping force is generated. When the determination unit 160 determines that the clamping force is generated, the output unit 164 turns on the clamping force generation lamp 156. As a result, the user can easily confirm the clamping force generation state by visually confirming the clamping force generation lamp 156.

According to the present embodiment, when it is determined that the workpiece is clamped, the determination unit 160 generates a predetermined clamping force on the workpiece based on a comparison between the output signal of the proximity sensor 144 and the clamping force generation threshold value Zc. It is possible to determine easily and reliably whether a predetermined clamping force is reliably generated on the workpiece.

Further, the detection surface 146 of the knuckle joint 142 is inclined toward the side where the rotatable shaft 82 is positioned toward the first link portion 68. In other words, since the detection surface 146 of the knuckle joint 142 is inclined with respect to the axis of the piston rod 30, the distance d2 between the detection coil 148 of the proximity sensor 144 and the detection surface 146 can be gradually changed. Thereby, the clamping force generation threshold value Zc can be easily set without changing the position of the proximity sensor 144.

Third Embodiment

Figure 11:
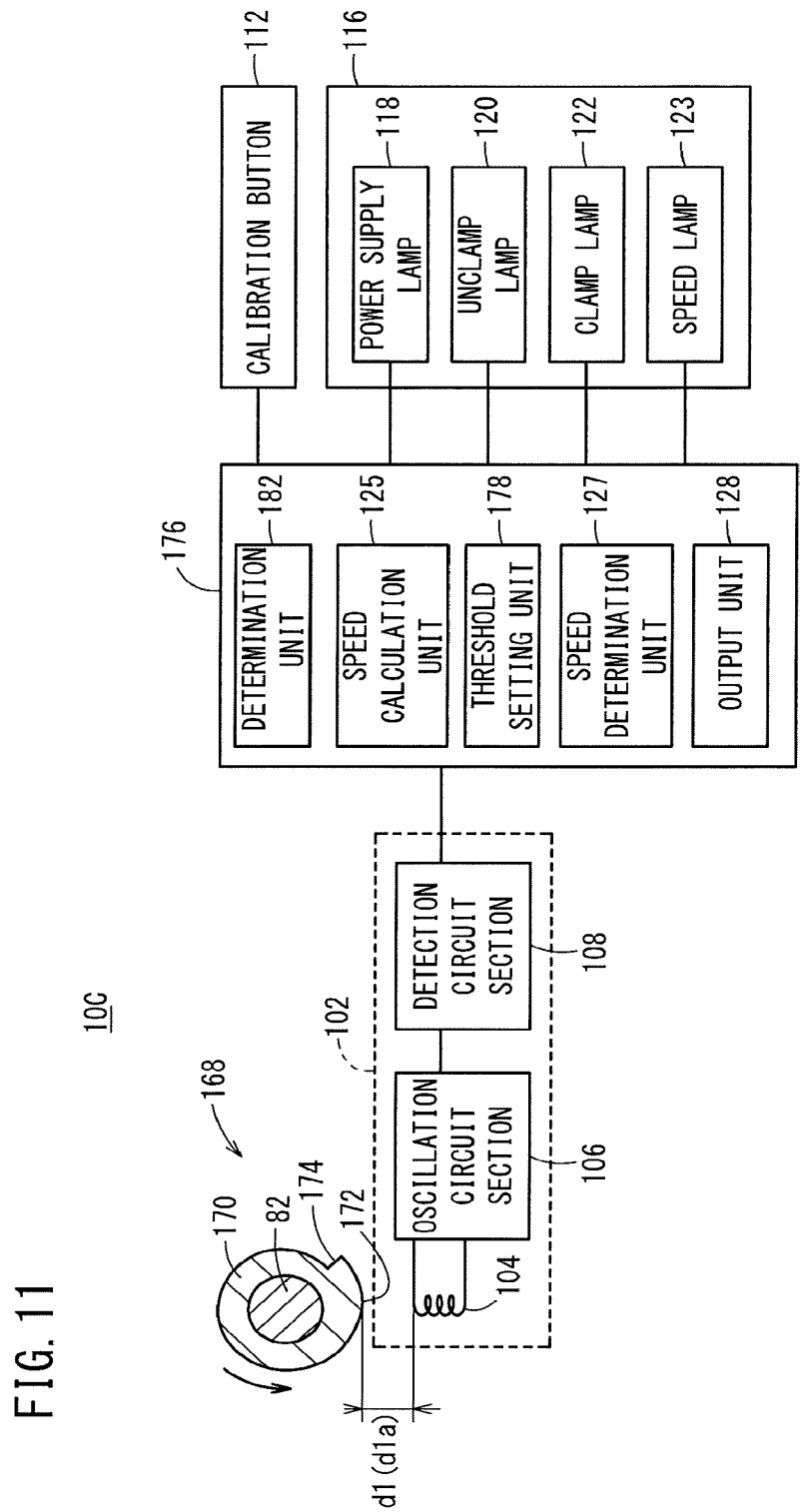
FIG. 11 is a block diagram of a clamp device according to a third embodiment of the present invention.
Figure 12A:
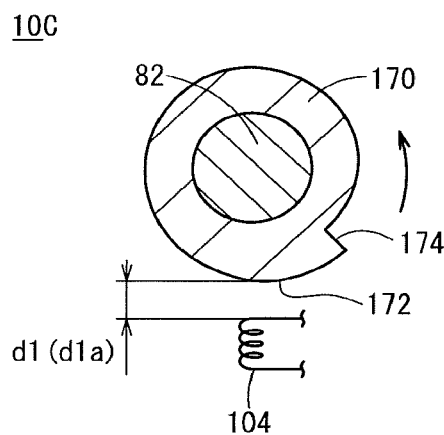
FIG. 12A is a schematic cross-sectional view showing the first state of the cam portion of FIG. 11.
Figure 12B:
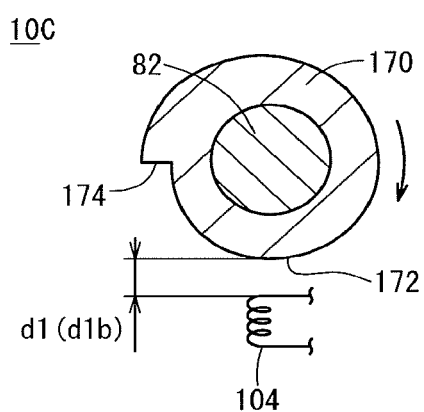
FIG. 12B is a schematic cross-sectional view showing the second state of the cam portion.

Next, a clamp device 10C according to a third embodiment of the present invention will be described. As shown in FIG. 11, the detecting portion 168 of the clamp device 10C according to the present embodiment includes a cam portion 170. As shown in FIGS. 12A and 12B, the cam portion 170 is formed such that the radial distance from the center of the rotatable shaft 82 to the cam surface 172 gradually increases along the circumferential direction. Further, the cam portion 170 is made of a metal material that generates an eddy current loss of iron or the like. The cam surface 172 is provided around the entire circumference (range of 360 degrees) of the outer peripheral surface of the cam portion 170. In other words, the cam portion 170 is provided with a stepped portion 174 connecting the portion of the cam surface 172 having the minimum radius and the portion of the maximum radius.

The distance between the cam surface 172 and the detection coil 104 in a complete clamp state (a state in which the clamp arm 17 is in contact with the workpiece) is d1a (see FIG. 12A). The distance between the cam surface 172 and the detection coil 104 in a complete unclamp state (a state in which the clamp arm 17 is stopped without contacting the workpiece) is d1b (see FIG. 12B).

Figure 13:
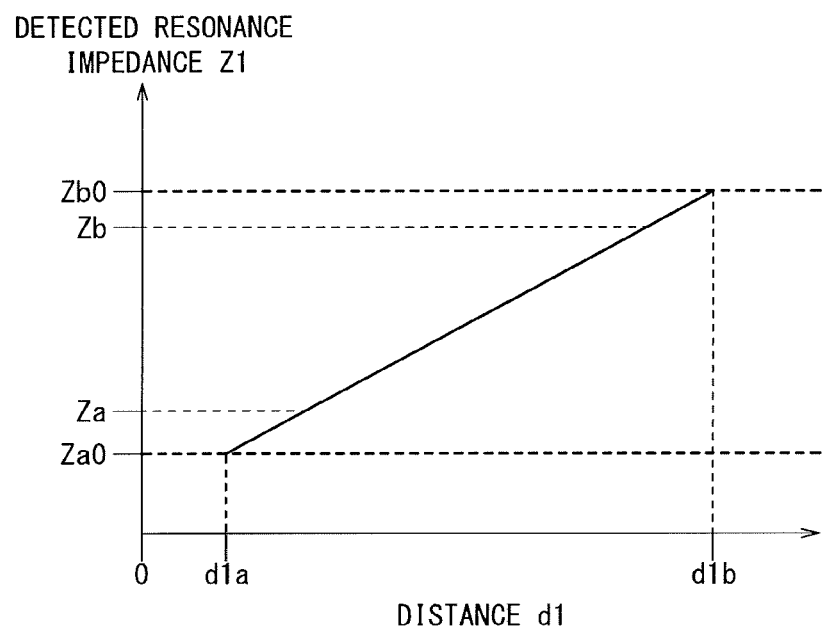
FIG. 13 is a graph showing the relationship between the distance between the cam surface of the cam portion of FIG. 11 and the detection coil and the detected resonance impedance.

The cam portion 170 is fixed to the outer peripheral surface of the rotatable shaft 82 so that the distance d1a is greater than the distance d1b, and the stepped portion 174 does not face the detection coil 104 during the rotation of the clamp arm 17. In the case of using such a cam portion 170, as shown in FIG. 13, the detected resonance impedance Z1 becomes linearly smaller (like the linear function), as the distance d1 between the cam surface 172 and the detection coil 104 becomes shorter.

As shown in FIG. 11, the control unit 176 of the clamp device 10C includes a speed calculation unit 125, a speed determination unit 127, an output unit 128, a threshold value setting unit 178, and a determination unit 182.

The threshold value setting unit 178 sets, as the clamp threshold value Za, a value obtained by adding the offset amount to the detected resonance impedance Z1 at the time when the calibration button 112 is subjected to the first operation. In the present embodiment, since the calibration button 112 is subjected to the first operation in the complete clamped state, the threshold value-setting unit 178 adds the offset amount to the detected resonance impedance Z1 in the complete clamped state (referred to as the clamp resonance impedance Za0) and sets the value as the clamp threshold value Za.

Further, the threshold value setting unit 178 sets a value obtained by subtracting the offset amount from the detected resonance impedance Z1 when the calibration button 112 is subjected to the second operation as the unclamp threshold value Zb. In the present embodiment, since the calibration button 112 is subjected to the second operation in the complete unclamp state, the threshold value setting unit 178 subtracts the offset from the detected resonance impedance Z1 in the complete unclamp state (referred to as unclamp resonance impedance Zb0) and sets the value as the unclamp threshold value Zb.

When the output signal (detected resonance impedance Z1) of the proximity sensor 102 falls within the acceptable range for clamping defined by the clamp threshold value Za and the angular speed of the clamp arm 17 calculated by the speed calculation unit 125 continues for a predetermined time period to be zero, the determination unit 182 determines the clamp state. Here, the acceptable range for clamping means the range between the clamp resonance impedance Za0 and the clamp threshold value Za.

When the output signal (detected resonance impedance Z1) of the proximity sensor 102 falls within the acceptable range for unclamping defined by the unclamp threshold value Zb and the angular speed of the clamp arm 17 calculated by the speed calculation unit 125 continues for a predetermined time to be zero, the determination unit 182 determines the unclamp state. Here, the acceptable range for unclamping is a range between unclamp resonance impedance Zb0 and unclamp threshold Zb. The predetermined time used in the determination unit 182 can be arbitrarily set.

Further, when the angular speed of the clamp arm 17 calculated by the speed calculation unit 125 continues to be a non-zero value for a predetermined time, the determination unit 182 determines that the angular speed is an intermediate state (a transition state between the clamped state and the unclamp state).

In the present embodiment, when clamping a workpiece, in the clamp device 10C in the initial state (unclamp state), the compressed fluid is supplied to the first port 34 in a state in which the second port 38 is open to the atmosphere. Then, as shown in FIG. 14A, the rotatable shaft 82 and the clamp arm 17 start to rotate integrally in a clockwise direction at the time point T1.

That is, since the angular speed is generated at the clamp arm 17 at time T1, the determination unit 182 determines that the state is an intermediate state. Then, the output unit 128 turns off the unclamp lamp 120 (de-energizing the unclamp lamp 120). As a result, the user can confirm that the clamp device 10C is in the intermediate state by visually confirming the unclamp lamp 120 and the clamp lamp 122 turned off.

After the lapse of the time point T1, the detected resonance impedance Z1 reaches the unclamp threshold Zb at the time T2, reaches the clamp threshold Za at the time T3, and reaches the clamping resonance impedance Za0 at the time T4 (located within the acceptable range for clamping).

At time T4, the clamp arm 17 contacts the workpiece, and the angular speed of the clamp arm 17 calculated by the speed calculation unit 125 is zero. Then, during a period from time T4 to time T5, the angular speed of the clamp arm 17 continues to be zero. Therefore, at the time point T5, the determination unit 182 determines that the clamp state is set, and the output unit 128 turns on the clamp lamp 122 (energizing the clamp lamp 122) while turning off the unclamp lamp 120. As a result, the user can confirm that the workpiece is in a complete clamp state by visually confirming the lighting of the clamp lamp 122.

On the other hand, when unclamping the workpiece, in the clamp device 10C in the clamped state, the compressed fluid is supplied to the second port 38 while the first port 34 is open to the atmosphere. Then, as shown in FIG. 14B, the rotatable shaft 82 and the clamp arm 17 start to rotate integrally in a counterclockwise direction at the time point T11.

That is, since the angular speed is generated at the clamp arm 17 at the time point T11, the determination unit 182 determines the intermediate state. Then, the output unit 128 turns off the clamp lamp 122 (de-energizing the clamp lamp 122). As a result, the user can confirm that the clamp device 10C is in the intermediate state by visually confirming the unclamp lamp 120 and the clamp lamp 122 turned off.

After the lapse of the time point T11, the detected resonance impedance Z1 reaches the clamp threshold value Za at the time point T12, reaches the unclamp threshold value Zb at the time point T13, and reaches the unclamping resonance impedance Zb0 at the time point T14 (located in the acceptable range for unclamping).

At time T14, the piston 26 contacts the damper 44, and the angular speed of the clamp arm 17 calculated by the speed calculation unit 125 is zero. Then, during a period from time T14 to time T15, the angular speed of the clamp arm 17 continues to be zero. Therefore, at the time point T15, the determination portion 182 determines the unclamp state, and the output unit 128 turns on the unclamp lamp 120 (energizing the unclamp lamp 120) while keeping the clamp lamp 122 turned off. As a result, the user can confirm that the workpiece is in a completely unclamp state by viewing the turning on of the unclamp lamp 120.

According to the present embodiment, the threshold value setting unit 178 sets a value obtained by adding the offset amount to the clamp resonance impedance Za0 as the clamp threshold value Za. Therefore, even when the proximity sensor 102 has temperature characteristics, it is possible to detect reliably the detected resonance impedance Z1 smaller than the clamp threshold value Za.

When the detected resonance impedance Z1 falls within the acceptable range for clamping and the angular speed of the clamp arm 17 calculated by the speed calculation unit 125 continues to be zero for a predetermined period of time, the determination unit 182 determines the clamp state.

Therefore, even when the clamp threshold value Za is set at a value deviated from the clamp resonance impedance Za0 to the unclamp side, it is possible to reliably and easily determine the complete clamp state.

According to the present embodiment, the threshold value setting unit 178 sets the value obtained by subtracting the offset amount from the unclamp resonance impedance Zb0 as the unclamp threshold value Zb. Therefore, even when the proximity sensor 102 has a temperature characteristic, it is possible to reliably detect the detected resonance impedance Z1 that is larger than the unclamp threshold value Zb.

When the detected resonance impedance Z1 falls within the unclamping permissible range and the angular speed of the clamp arm 17 calculated by the velocity calculating unit 125 continues to be zero for a predetermined time period, the determination unit 182 is in the unclamp state.

Therefore, even when the unclamp threshold value Zb is set at a value deviated from the unclamp resonance impedance Zb0 to the clamp side, it is possible to reliably and easily determine the complete unclamp state.

Figures 15A, 15B:
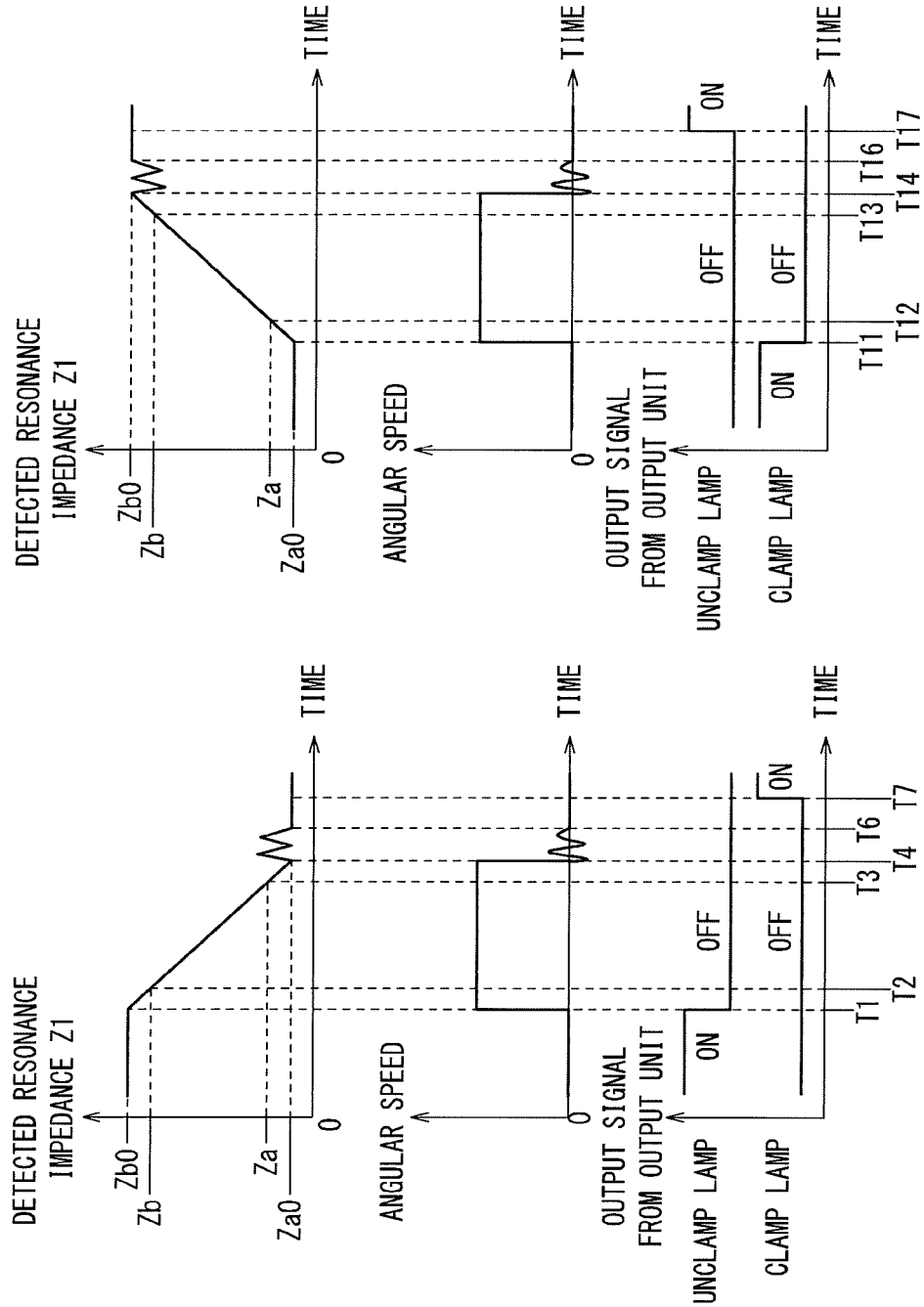
FIG. 15A is a third timing chart for explaining the clamping operation of the clamp device shown in FIG. 11.
FIG. 15B is a fourth timing chart for explaining the unclamping operation of the clamp device.

In the present embodiment, for example, when the rotatable shaft 82 attenuates and vibrates when the clamp arm 17 comes into contact with the workpiece, the detected resonance impedance Z1 and the angular speed of the clamp arm 17 calculated by the speed calculation unit 125 also undergo damped oscillation (See FIG. 15A). In this case, the detected resonance impedance Z1 and the damped oscillation of the angular speed stop at time T6.

Then, during the period from time T6 to time T7, the angular speed of the clamp arm 17 continues to be zero.

Therefore, at the time point T7, the determination unit 182 determines the clamp state. Therefore, it is possible to prevent the clamp arm 17 during damped vibration from being determined to be in the clamped state. That is, even when the clamp arm 17 undergoes damped vibration, it is possible to determine the complete clamped state reliably and easily. Thereby, it is possible to suppress the output signal from the output unit 128 to the clamp lamp 122 from chattering and causing blinking of the clamp lamp 122.

Further, for example, in damped vibration of the rotatable shaft 82 when the piston 26 contacts the damper 44, the detected resonance impedance Z1 and the angular speed of the clamp arm 17 calculated by the speed calculation unit 125 also undergo damped vibration (see FIG. 15B reference). In this case, the damped vibrations of the detected resonance impedance Z1 and the angular speed stop at time T16.

Then, during the period from the time T16 to the time T17, the angular speed of the clamp arm 17 continues to be zero. Therefore, at time point T17, the determination unit 182 determines the unclamp state. Therefore, it is possible to prevent the clamp arm 17 during damped vibration from being determined to be in the unclamp state. That is, even when the clamp arm 17 undergoes damped vibration, it is possible to determine the complete unclamp state reliably and easily. Thereby, it is possible to suppress the output signal from the output unit 128 to the unclamp lamp 120 from chattering and causing blinking of the unclamp lamp 120.

Figure 16A:
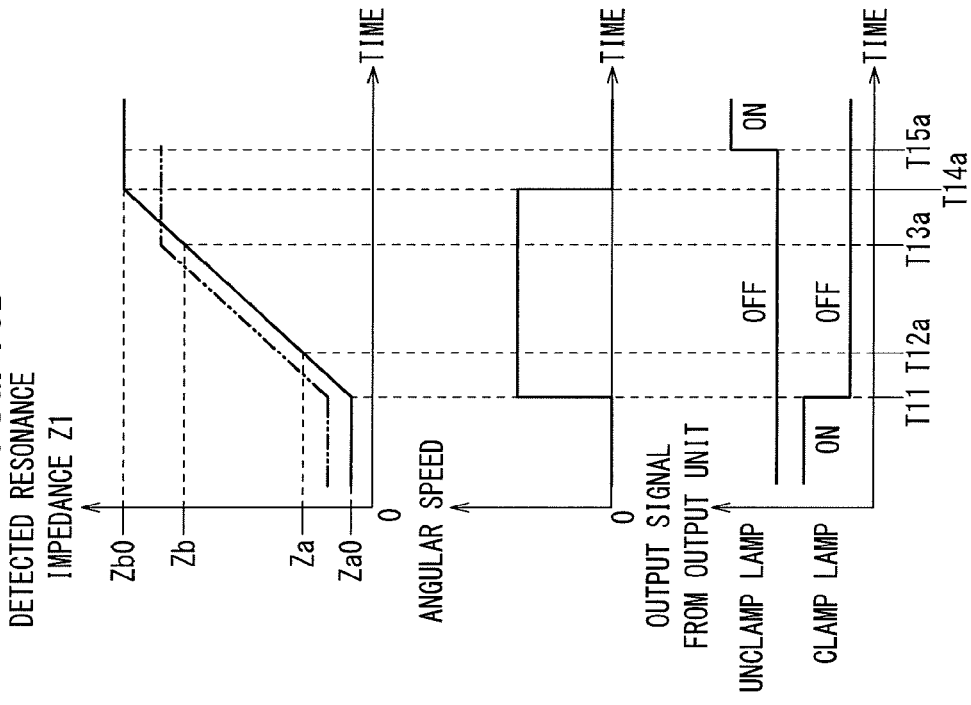
FIG. 16A is a fifth timing chart for explaining the clamping operation of the clamp device shown in FIG. 11.
Figure 16B:
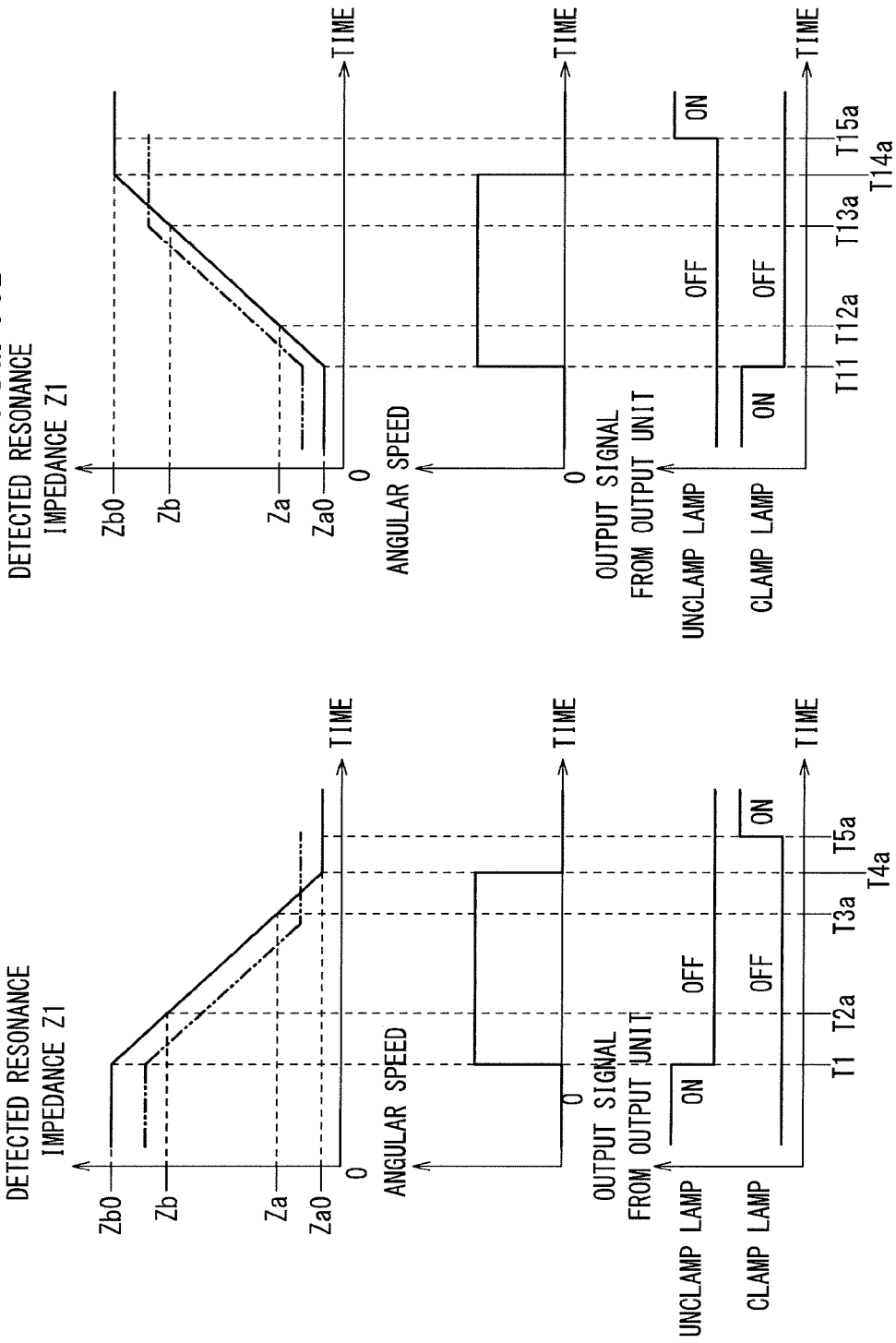
FIG. 16B is a sixth timing chart for explaining the unclamping operation of the clamp device.

In the present embodiment, for example, when a backlash occurs in the rotatable shaft 82 or the like due to aged deterioration of the clamp device 10C, the clamp resonance impedance Za0 decreases and the unclamp resonance impedance Zb0 increases (see FIGS. 16A and 16B). In FIGS. 16A and 16B, a graph in which the rotatable shaft 82 and the like of no backlash is indicated by a two-dot chain line, and a graph in which the rotatable shaft 82 and the like with backlash is indicated by a solid line.

In the case of clamping a workpiece with such a clamp device 10C, as shown in FIG. 16A, the detected resonance impedance Z1 reaches the unclamp threshold Zb at the time T2a, reaches the clamp threshold Za at the time T3a, and at the time T4a the clamping resonance Reaches the impedance Za0 (located within the acceptable range for clamping).

At time T4a, the clamp arm 17 contacts the workpiece, and the angular speed of the clamp arm 17 calculated by the speed calculation unit 125 is zero. Then, during a period from time T4a to time T5a, the angular speed of the clamp arm 17 continues to be zero. Therefore, at the time point T5a, the determination portion 182 determines the clamp state, and the output unit 128 turns on the clamp lamp 122 (energizing the clamp lamp 122) while turning off the unclamp lamp 120.

On the other hand, when unclamping the workpiece, as shown in FIG. 16B, the detected resonance impedance Z1 reaches the clamp threshold value Za at the time point T12a, reaches the unclamp threshold value Zb at the time point T13a, reaches the unclamping resonance impedance Zb0 at the time point T14a (located in the acceptable range for unclamping).

At the time point T14a, the piston 26 contacts the damper 44, and the angular speed of the clamp arm 17 calculated by the speed calculation unit 125 is zero. Then, in a period from the time T14a to the time T15a, the angular speed of the clamp arm 17 continues to be zero for a predetermined time.

Therefore, at the time point T15a, the determination portion 182 determines the unclamp state, and the output unit 128 turns on the unclamp lamp 120 (energizing the unclamp lamp 120) while keeping the clamp lamp 122 turned off.

As described above, in the present embodiment, even when a backlash occurs in the rotatable shaft 82 or the like, the complete clamped state and the complete unclamp state can be reliably and easily determined without resetting the clamp threshold value Za and the unclamp threshold value Zb.

According to the present embodiment, the speed calculation unit 125 calculates the angular speed of the clamp arm 17 by constantly differentiating (using the difference) the output signal (detected resonance impedance Z1) of the proximity sensor 102. Therefore, even if a new sensor for calculating the angular speed of the clamp arm 17 is not provided, the angular speed can be easily acquired.

In the present embodiment, the determination unit 182 may determine the clamp state when the detected resonance impedance Z1 falls within the acceptable range for clamping and the angular speed of the clamp arm 17 is zero. In this case, since the clamping state is determined at the time when the angular speed of the clamp arm 17 becomes zero, the time required until the determination can be shortened.

Further, the determination unit 182 may determine the unclamp state when the detected resonance impedance Z1 falls within the acceptable range for unclamping and the angular speed of the clamp arm 17 is zero. In this case, since it can be determined that the clamp arm 17 is in the unclamp state when the angular speed of the clamp arm 17 becomes zero, the time required for the determination can be shortened.

In the present embodiment, the determination unit 182 may determine the clamp state when the detected resonance impedance Z1 falls within the acceptable range for clamping and the angular acceleration of the clamp arm 17 is zero (or is zero for a predetermined period of time). If the detected resonance impedance Z1 falls within the acceptable range for unclamping and the angular acceleration of the clamp arm 17 is zero (or is zero for a predetermined period of time), the determination unit 182 determines the unclamp state. The angular acceleration of the clamp arm 17 can be calculated by a second-order, constant differentiation of the detected resonance impedance Z1 by the speed calculation unit 125. Even in this case, the same action and effect as in the case of using the angular speed is exhibited.

Figure 17A:
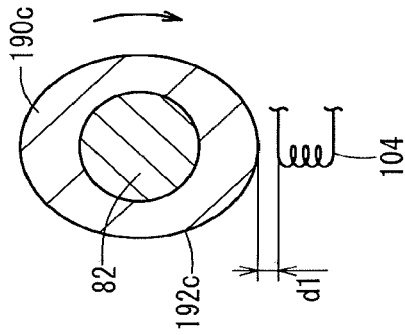
FIG. 17A is a schematic cross-sectional view showing a cam portion according to a first modified example.

The clamp devices 10A to 10C are not limited to the above-described configuration. For example, the clamp devices 10A to 10C may be provided with a cam portion 190a according to a first modification having a cam surface 192a on the outer peripheral surface, which is formed as a circular arc plate (see FIG. 17A). In this case, the cam portion 190a can be fixed to the rotatable shaft 82 by, for example, a screw member (not shown) or the like.

Figure 17B:
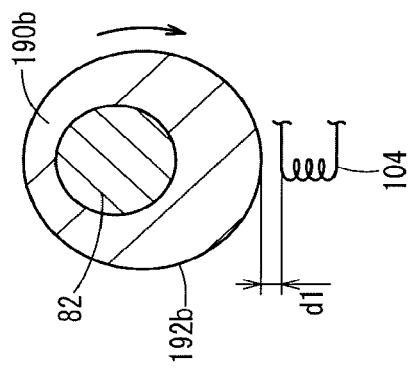
FIG. 17B is a schematic cross-sectional view showing a cam portion according to a second modified example.
Figure 17C:
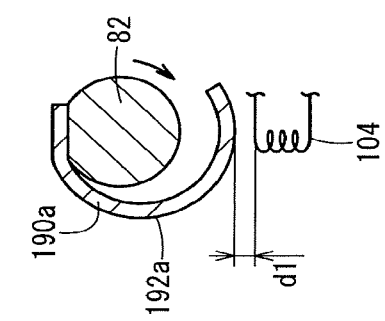
FIG. 17C is a schematic cross-sectional view showing a cam portion according to a third modified example.

In addition, the clamp devices 10A to 10C may be provided with a cam portion 190b according to a second modification having a cam surface 192b on the outer peripheral surface, which is configured as a so-called eccentric cam (see FIG. 17B). Further, the clamp devices 10A to 10C may be provided with a cam portion 190c according to a fourth modification having a cam surface 192c on the outer peripheral surface formed in an elliptical cross section (see FIG. 17C). It be clearly understood that the cam portions 190a to 190c are made of a metal material which generates eddy current loss of iron or the like. As described above, even when the cam portions 190*a* to 190*c* according to the first to third modifications are adopted, the above-described effects and advantages are achieved.

Instead of the cam portion 98, the clamp devices 10A and 10B may include the cam portion 170 of the clamp device 10C. Further, the clamp device 10C may be provided with a cam portion 98 instead of the cam portion 170. Even in these cases, the above-described action and effect are achieved.

In the clamp devices 10A to 10C, by changing the cylinder tube 22 to a cylinder tube longer or shorter than the entire length of the cylinder tube 22, the range of the rotational angle of the clamp arm 17 may be adjusted by changing the stroke length of the piston 26. Further, the driving section may be constituted by, for example, an electric motor or the like.

The clamp device according to the present invention is not limited to the above-described embodiment, but it is a matter of course that various configurations can be adopted without departing from the gist of the present invention.

The invention claimed is:

1. A clamp device for clamping a workpiece by a rotatable clamp arm, comprising:
    a clamp body;
    a driving unit provided on the clamp body;
    a rotatable shaft integrally rotating with the clamp arm under an action of the driving unit; and
    a detecting portion for detecting a rotational position of the clamp arm, wherein
    the detecting portion comprises:
        a cam portion disposed on the rotatable shaft and including a predetermined cam surface, the cam portion being formed so that a distance in a radial direction from a center of the rotatable shaft to the cam surface varies along a circumferential direction; and
        only one cam surface proximity sensor for detecting a position on the cam surface which is displaced as the rotatable shaft rotates between an open position and a clamped position of the clamp arm.

2. The clamp device according to claim 1, further comprising:
    a determination unit for determining whether the clamp device is in a clamp state based on a comparison between an output signal from the only one cam surface proximity sensor and a predetermined clamp threshold value or the clamp device is in an unclamp state based on a comparison between the output signal of the only one cam surface proximity sensor and a predetermined unclamp threshold value.

3. The clamp device according to claim 2, further comprising:
    a clamp lamp that is disposed so as to be visible from outside and turned on when the determination unit determines the clamp state; and
    an unclamp lamp that is disposed so as to be visible from the outside and turned on when the determination unit determines the unclamp state.

4. The clamp device according to claim 2, further comprising:
    a setting operation section operable by a user; and
    a threshold value setting unit for setting the clamp threshold value based on the output signal of the only one cam surface proximity sensor when a first operation is made to the setting operation section, and for setting the unclamp threshold value based on the output signal of the only one cam surface proximity sensor when a second operation is made to the setting operation section.

5. The clamp device according to claim 4, wherein the driving unit comprises:
    a cylinder tube;
    a piston reciprocating in the cylinder tube along the axial direction under the action of fluid pressure, and
    a piston rod connected to said piston,
    the piston rod is equipped with a link mechanism which converts a reciprocating motion of said piston into a rotational motion of the rotatable shaft,
    the detecting portion is provided with a detecting body that is displaced in stroke together with the piston rod, and a detecting body proximity sensor for detecting a position of the detecting body in the clamp state, and
    the determination unit configured to determine a clamping force generation state based on a comparison between an output signal of the detecting body proximity sensor and a predetermined clamping force generation threshold value when the clamp state has been determined.

6. The clamp device according to claim 5, wherein
    a portion of the detecting body facing the detecting body proximity sensor is provided with a detection surface inclined with respect to an axis of the piston rod, and
    the threshold value setting unit sets the clamping force generation threshold value based on the output signal of the detecting body proximity sensor output when a third operation is made to the setting operation section.

7. The clamp device according to claim 5, further comprising:
    a clamping force generation lamp disposed so as to be visible from the outside and turned on when the determination unit determines a clamping force generation state.

8. The clamp device according to claim 2, wherein the determination unit determines the clamp state when the output signal of the only one cam surface proximity sensor falls within the acceptable range for clamping defined by the clamp threshold, and an angular speed or angular acceleration of the clamp arm is zero.

9. The clamp device according to claim 8, wherein the determination unit determines that the output signal of the only one cam surface proximity sensor falls within the acceptable range for unclamping defined by the unclamp threshold value, and the angular speed or angular acceleration of the clamp arm is zero.

10. The clamp device according to claim 9, further comprising:
    a speed calculation unit for calculating the angular speed or the angular acceleration based on the output signal of the only one cam surface proximity sensor.

11. The clamp device according to claim 8, further comprising:
    a speed calculation unit for calculating the angular speed or the angular acceleration based on the output signal of the only one cam surface proximity sensor.

12. The clamp device according to claim 2, wherein the determination unit determines the clamp state when the output signal of the only one cam surface proximity sensor falls within the acceptable range for clamping defined by the clamp threshold, and an angular speed or angular acceleration of the clamp arm continues to be zero for a predetermined period of time.

13. The clamp device according to claim 12, wherein the determination unit determines that the output signal of the only one cam surface proximity sensor falls within the acceptable range for unclamping defined by the unclamp threshold value, and the angular speed or angular acceleration of the clamp arm continues to be zero for a predetermined period of time.

14. The clamp device according to claim 13, further comprising:
a speed calculation unit for calculating the angular speed or the angular acceleration based on the output signal of the only one cam surface proximity sensor.

15. The clamp device according to claim 12, further comprising:
a speed calculation unit for calculating the angular speed or the angular acceleration based on the output signal of the only one cam surface proximity sensor.

16. The clamp device according to claim 1, further comprising:
a rotation angle range adjustment mechanism.

17. The clamp device according to claim 1, wherein
the cam portion is made of a metal material, and
the only one cam surface proximity sensor is an induction-type proximity sensor.

18. The clamp device according to claim 1, wherein the only one cam surface proximity sensor is disposed in the clamp body, the clamp body being formed of a material including metal.

19. The clamp device according to claim 1, further comprising:
a speed calculation unit for calculating an angular speed of the clamp arm based on the output signal of the only one cam surface proximity sensor; and
a speed determination unit for judging whether or not the angular speed calculated by the speed calculating unit is equal to or less than a predetermined speed threshold value.

20. The clamp device according to claim 19, further comprising:
a speed lamp disposed to be visible from the outside and turned on when the speed determination unit determines that the angular speed exceeds the speed threshold value.

* * * * *